(12) United States Patent
Lin

(10) Patent No.: US 6,480,789 B2
(45) Date of Patent: *Nov. 12, 2002

(54) POSITIONING AND PROXIMITY WARNING METHOD AND SYSTEM THEREOF FOR VEHICLE

(75) Inventor: Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 09/730,411

(22) Filed: Dec. 4, 2000

(65) Prior Publication Data

US 2002/0069019 A1 Jun. 6, 2002

(51) Int. Cl.[7] .............................. G06F 19/00; G06G 7/78
(52) U.S. Cl. ...................... 701/301; 701/300; 701/120; 701/122; 340/947; 340/961; 342/29; 342/32; 342/64; 342/65
(58) Field of Search ................................. 701/300, 301, 701/117, 120, 213, 215, 9, 10, 14, 15, 16; 340/961, 945, 947; 342/29, 30, 125, 357.06, 357.13, 32, 36, 63, 64, 65

(56) References Cited

U.S. PATENT DOCUMENTS

| | | | | |
|---|---|---|---|---|
| 5,983,161 A | * | 11/1999 | Lemelson et al. | 340/436 |
| 6,133,867 A | * | 10/2000 | Eberwine et al. | 342/125 |
| 6,134,484 A | * | 10/2000 | Geier et al. | 342/357.06 |
| 6,157,891 A | * | 12/2000 | Lin | 244/180 |
| 6,275,773 B1 | * | 8/2001 | Lemelson et al. | 340/436 |
| 6,314,366 B1 | * | 11/2001 | Farmakis et al. | 340/961 |
| 6,345,233 B1 | * | 2/2002 | Erick | 340/901 |

* cited by examiner

Primary Examiner—Jacques H. Louis-Jacques
(74) Attorney, Agent, or Firm—Raymond Y. Chan; David & Raymond Patent Group

(57) ABSTRACT

A positioning and proximity warning method for vehicle includes the steps of outputting global positioning system signals to an integrated positioning/ground proximity warning system processor; outputting an inertial navigation solution to an integrated positioning/ground proximity warning processor; measuring air pressure, and computing barometric measurements which is output to the integrated positioning/ground proximity warning processor; measuring time delay between transmission and reception a radio signal from a terrain surface, and computing radio altitude measurement which is output to the integrated positioning/ground proximity warning processor; accessing a terrain database for obtaining current vehicle position and surrounding terrain height data which is output to the integrated positioning/ground proximity warning processor; and receiving the position, velocity and time information or said pseudorange and delta range measurements of said global positioning system, the inertial navigation solution, the radio altitude measurement, the radio altitude measurement, and the current vehicle position and surrounding terrain height data, and computing optimal positioning solution data and optimal ground proximity warning solution data. Furthermore, a positioning and proximity warning method for vehicles further includes the steps of outputting the optimal positioning solution data and position data of near objects to an object tracking and collision avoidance processor to determine a potential collision threat with the near object.

26 Claims, 14 Drawing Sheets

POSITIONING AND PROXIMITY WARNING METHOD AND SYSTEM THEREOF FOR VEHICLE

FIELD OF THE PRESENT INVENTION

The present invention relates to an integrated positioning/proximity warning method and system thereof for vehicles, in which the information from the sensors of the positioning system and the ground proximity warning system are integrated to obtain improved performance of positioning and ground/water proximity warning functions; position data of near objects from an onboard object detection system is further incorporated to warn and avoid a potential collision hazard with the near objects.

BACKGROUND OF THE PRESENT INVENTION

Nowadays, there exist stand-alone operating positioning systems and ground proximity warning systems in civil aircraft. A positioning system is used to provide position, velocity, attitude, attitude rate information, and etc., for an aircraft flight control and management system. A ground proximity warning system is used to provide warning messages to prevent aircraft from inadvertently contacting with the ground or water.

Traditionally, positioning equipment in a civil aircraft generally employs an inertial navigation system and some radio navigation systems, such as a long range navigation system, a very-high-frequency omnidirectional range system, distance measurement equipment, tactical air navigation, and the newest global positioning system. Recently, integrated global positioning systems/inertial navigation systems have been the predominant navigation system in civil and military aircraft, replacing traditional navigation systems.

Generally speaking, an inertial navigation system comprises an onboard inertial measurement unit, a processor, and embedded software. The positioning solution is obtained by numerically solving Newton's equations of motion using measurements of vehicle specific forces and rotation rates obtained from onboard inertial sensors. The onboard inertial sensors consist of accelerometers and gyros, which, together with the associated hardware and electronics, comprise the inertial measurement unit.

The inertial navigation system may be mechanized in either a gimbaled or strapdown configuration. In a gimbaled inertial navigation system, the accelerometers and gyros are mounted on a gimbaled platform to isolate the sensors from the rotations of the vehicle, and to keep the measurements and navigation calculations in a stabilized navigation coordinated frame. Some possible navigation frames include earth centered inertial, earth centered earth fixed, locally level, with axes in the directions of north, east, down (of course, there is east, north, zenith or north, west, zenith, and locally level with a wander azimuth). In a strapdown inertial navigation system, the inertial sensors are rigidly mounted to the vehicle body frame, and a coordinate frame transformation matrix (analyzing platform) is used to transform the body-expressed acceleration to a navigation frame to perform the navigation computations in the stabilized navigation frame. Gimbaled inertial navigation systems can be more accurate and easier to calibrate than strapdown inertial navigation systems. Strapdown inertial navigation systems can be subjected to higher dynamic conditions (such as high turn rate maneuvers) which can stress inertial sensor performance. However, with the availability of newer gyros and accelerometers, strapdown inertial navigation systems are becoming the predominant mechanization, due to their low cost and reliability.

In principle, inertial navigation systems permit pure autonomous operation and output continuous position, velocity, and attitude vehicle data after initializing the starting position and initiating an alignment procedure. In addition to autonomous operation, other advantages of an inertial navigation system include the full navigation solution and wide bandwidth. However, an inertial navigation system is expensive and subjected to drift over an extended period of time. This error propagation characteristic is primarily caused by its inertial sensor error sources, such as gyro drift, accelerometer bias, and scale factor errors.

Generally, the accuracy of inertial navigation systems can be improved by employing highly accurate inertial sensors or by compensating with data from an external sensor.

The cost of developing and manufacturing inertial sensors increases as the level of accuracy improves. The advances in new inertial sensor technologies and electronic technologies have led to the availability of low cost inertial sensors, such as mechnical-electronis-micro-system inertial sensors. Mechnical-electronic-micro-system inertial sensors borrow processes from the semiconductor industry to fabricate tiny sensors and actuators on silicon chips. The precision of these new inertial sensors may be less than what conventional sensors achieve, but they have enormous cost, size, weight, thermal stability and wide dynamic range advantages over conventional inertial sensors.

The most obvious choice for implementing low cost, highly accurate, continuous positioning of a vehicle is to employ a low cost strapdown inertial system with the compensating of an external sensor. The global positioning system receiver is an ideal external sensor for an inertial navigation system.

The global positioning system is a space-based, worldwide, all-weather passive radio positioning and timing system which was developed and implemented over the course of the past two decades. The system was originally designed to provide precise position, velocity, and timing information on a global common grid system to an unlimited number of adequately equipped air, land, sea, and even space authorized users and civil users.

The global positioning system has three major operational segments:

Space Segment: The Space segment consists of a constellation of satellites (21 navigation satellites plus 3 active spares) in semi-synchronous orbit around the earth.

Control Segment: The control segment consists of one master ground control station and several other monitor stations with tracking antennas at accurately known positions throughout the earth.

User Segment: The User Segment is composed of the various kinds of end user with global positioning system receiving equipment.

The global positioning system user equipment comprises an antenna, a receiver, and associated electronics and displays, and receives signals from the global position system satellites to obtain a position, velocity, and time solution.

The global positioning system can provide Precise Positioning Service to authorized users, which is nominally within 15 meters Spherical Error Probable accuracy, and can provide Standard Position Service to civil users, which is limited to within roughly 100 meters (95% probability) by a number of error sources including ionospheric and troposheric effects and intentional degradation of the global positioning system signal, known as selective availability.

The global positioning system principle of operation is based on range triangulation. If the satellite position is known accurately via ephemeris data, the user can receive the satellite's transmitted signal and determine the signal propagation time. Since the signal travels at the speed of light, the user can calculate the measured range to the satellite. The actual range measurement (called the "pseudo range") contains errors because of a bias in the user's clock relative to the global positioning system reference time. Because atomic clocks are utilized in the satellites, their errors are much smaller in magnitude than the users' clocks. Thus, for three-dimensional position determination, and also to calculate the clock bias, a minimum of four satellites is needed to obtain a solution to the navigation problem. The velocity can be obtained by various methods, which basically amount to time differencing the pseudo ranges over the measurement time interval.

As with any other measurement system, a global positioning system contains a number of error sources, such as the signal propagation errors and satellite errors, including selective availability. The user range error is the resultant ranging error along the line-of-sight between the user and the global positioning system satellite. Global positioning system errors tend to be relatively constant (on average) over time, thus giving global positioning systems long-term error stability. However, the signals of the global positioning system may be intentionally or unintentionally jammed or spoofed, or the global positioning system receiver antenna may be obscured during vehicle attitude maneuvering, and the global positioning system signals are lost when the signal-to-noise ratio is low, and the vehicle is undergoing highly dynamic maneuvers.

The inherent drawbacks of a stand-alone inertial navigation system and a stand-alone global positioning system receiver show that a stand-alone inertial navigation system or a stand-alone global positioning system receiver can not meet mission requirements under certain constraints, such as low cost, long-term high accuracy, continuous output, high degree of resistance to jamming, and high dynamics.

In the case of integration of a global positioning system with an inertial navigation system, the short term accuracy of the inertial navigation system and the long term stability and accuracy of the global positioning system directly compliment each other. The global positioning system is fairly accurate but available at a slower data rate. The inertial navigation system data has low noise and is available at high data rates, but it is subjected to biases and drift that cause the errors to grow with time. The performance characteristics of the mutually compensating stand-alone global positioning system receiver and the stand-alone inertial system suggest that, in many applications, an integrated global positioning system/inertial navigation system, combining the best properties of both fields, will provide optimal continuous navigation capability. This navigation capability is unattainable in either one of the two systems alone.

The potential advantages offered by an integration of a global positioning system receiver with an inertial navigation system are outlined as follow:

(1) The integration smoothes out the random component in global positioning system observation errors, and can compensate the navigation parameter errors and inertial sensor errors of the inertial navigation system while the global positioning system signal is available, so that the inertial navigation system can provide more accurate position and attitude information during an extended period of time after the global positioning system signals are lost.

(2) The aiding of the signal tracking loop process of the global positioning system receiver with inertial data. This allows the effective bandwidth of the loops to be reduced, resulting in an improved tracking signal in a noisy environment while not sacrificing global positioning system signal dynamic tracking performance.

There are usual signal tracking loop bandwidth versus dynamic performance tradeoffs commonly encountered in signal tracking loop design of a global positioning system receiver, wherein noise effects increase with increasing loop bandwidth, while dynamic tracking errors increase with decreasing loop bandwidth. The integrated global positioning/inertial navigation system can mitigate the conflicting signal tracking loop bandwidth requirements, because the global positioning system signal acquisition and tracking processes are aided by inertial navigation data.

(3) An inertial navigation system can, not only provide navigation information when the global positioning system signals are lost temporarily, but also reduce the search time required to reacquire the global positioning system signal.

(4) The global positioning system enables and provides on-the-fly alignment of an inertial navigation system by the means of maneuvering, eliminating the static self-alignment pre-mission requirements, and improving the reaction of the inertial navigation system.

However, there are still some drawbacks in conventional integrated global positioning/inertial navigation systems as follows:

(1) Poor vertical measurement accuracy, which can not meet the requirement for precise terminal approach, landing, and collision avoidance in heavy traffic airspace.

(2) Insufficient reliability. When a low cost, low accuracy inertial navigation system is employed to integrate with a global positioning system receiver, long-term navigation accuracy is mostly dependent on the global positioning system. If global positioning system signals are lost for a short period of time, or if the malfunction of a global positioning system satellite occurs, the navigation accuracy diverges very fast.

Therefore, there is an urgent need to overcome these drawbacks to enhance aviation safety.

As aviation markets are extended, there are more and more emphases on aviation safety. Usually, one aircraft accident classification scheme includes:

(1) Controlled Flight Into Terrain
(2) Loss of Control (caused by an aircraft malfunction)
(3) Loss of control (caused by crew error)
(4) Airframe structure or system failure
(5) Mid-air collision
(6) Ice/Snow
(7) Fuel exhaustion
(8) Loss of control (other)
(9) Runway Incursion Since the beginning of powered flight, Controlled Flight Into Terrain-type airplane accidents have been a worldwide problem and an important accident classification. In these airplane crash accidents, a properly functioning airplane under the control of a fully qualified and certified crew, often in clouds or darkness, is flown into terrain or water or obstacles with no apparent awareness on the part of the crew.

There is no airframe icing, no wind shear, no collision with other aircraft, and no loss of control.

The Controlled Flight Into Terrain has received a number of studies and considerable attention since the early 1970's.

Since the Federal Aviation Administration mandated an independent Ground Proximity Warning System in 1974 for commercial turbojet/turboprop aircraft with more than 10 passenger seats which fly in U.S. airspace, traditional ground proximity warning systems have dramatically reduced the number of Controlled Flight Into Terrain accidents among airlines, by monitoring the aircraft's height above ground as determined by a radio altimeter. There have been one to two aircraft Controlled Flight Into Terrain accidents a year in average since 1985. Before the mandate, it varied from seven to 18 a year.

The ground proximity warning system computer keeps track of the radio altimeter readings and other flight information and provides audible, visual, and meaningful warnings to aircrew when the aircraft flight status meets any of the following (1) Excessive descent rates while too close to the ground.

(2) Excessive terrain closure rates (aircraft is descending too quickly or is flying toward higher terrain).

(3) Excessive descent rates after takeoff.

(4) Inadvertent descent after takeoff.

(5) Insufficient terrain clearance.

(6) Flight into terrain at low altitude and not in approach and landing configuration.

Although traditional ground proximity warning systems have saved thousands of lives, it still fails to prevent all Controlled Flight Into Terrain accidents. Traditional ground proximity warning systems can not really tell what is ahead of the airplane. It can only look down, as the radio altimeter measures the distance from the airplane to the ground. The ground proximity warning system is designed to predict if a potential terrain problem lies ahead by tracking information from the recent past and projecting any trend into the future. This can warn a pilot, driver or operator when the airplane is flying towards terrain that slops upward, but it can not warn in time to avoid, for example, a sheer cliff or extremely steep slope. In addition, ground proximity warning systems have to be "desensitized" under certain conditions to prevent nuisance warnings. For instance, when wing flaps and landing gear are extended, the system is desensitized to prevent an unnecessary warning while the pilot intentionally flies the airplane toward the ground for landing.

The available improved ground proximity warning system, which is called the Enhanced Ground Proximity Warning System, is the result of an effort to further reduce the Controlled Flight Into Terrain risk. The enhanced ground proximity warning system uses a worldwide digital terrain database. Also, the enhanced ground proximity warning system adds two enhancements to the traditional ground proximity warning system:

(1) It can provide the flight crew a map-like display of nearby terrain.

(2) It sounds an audible alert approximately one minute's flight time or more away from terrain. Traditional ground proximity warning systems typically sound a warning from a few seconds to about 30 seconds from terrain, but average 10 to 15 seconds.

The enhanced ground proximity warning system computer uses information provided by the onboard navigation system and terrain database. The enhanced ground proximity warning system computer uses aircraft position, performance, and configuration data to calculate an envelope along the projected flight path of the aircraft and compares that to the terrain database.

Since the enhanced ground proximity warning system display can show nearby terrain, pilots are much less likely to continue flying toward that terrain.

In current developing degree of the positioning systems and the ground proximity warning systems, the positioning system and the ground proximity warning system are two separated independent systems, wherein another external positioning system is required to support the ground proximity warning system. As above mentioned, conventional integrated global positioning/inertial navigation systems integrates the information from an inertial measurement unit and a global positioning system receiver to obtain improved navigation solution. Conventional ground proximity warning systems use the position information provided by the conventional integrated global positioning/inertial navigation systems or stand-alone global positioning systems and the information from a radio altimeter and a baro altimeter and a terrain database to solve ground proximity warning problem. The process for both conventional integrated global positioning/inertial navigation systems and conventional ground proximity warning systems is implemented in software in microprocessors. As advances in speed and memory of microprocessors, it is possible to implement an integrated positioning and ground proximity warning system. Furthermore, an integrated process for position solution and ground proximity warning solution can provide better performance than an independent positioning system and an independent ground proximity warning system, because the information from the radio altimeter, the baro altimeter, and the terrain database which are employed by conventional ground proximity warning systems has potential capability for improving the accuracy and reliability of conventional positioning systems, and improved position information in turn improve the performance of conventional ground proximity warning systems.

As many of the aircraft operating in the same airspace fly in close formation and execute highly dynamic maneuvers, pilots have routinely identified a midair collision between aircraft as a most likely mishap.

In addition, it is possible to obtain optimal collision avoidance solution with near object by further incorporating an object detection system with the results of the integration of the ground proximity warning system and multiple navigation sensors.

In order to maximize safety of the vehicle operation for future commercial application, it is highly desired to develop an integrated system capable of providing optimal navigation solution, optimal ground/water/object collision avoidance capabilities.

SUMMARY OF THE PRESENT INVENTION

The main objective of the present invention is to provide an integrated positioning/proximity warning method and system for vehicles to avoid any collision.

Accordingly, compared to existing, separate processes and systems for positioning and ground proximity warning systems, it is a another objective of the present invention to provide an integrated method and system for positioning and preventing Controlled Flight Into Terrain flight accidents for aircraft to obtain improved performances, such as navigation accuracy, high degree of tolerance to loss of a global positioning system signal, global positioning system integrity monitoring, precise and reliable ground proximity warning information, and to make air travel safer in increasingly busy skies, as follows:

(1) The performance of an integrated positioning system and the ground proximity warning system is unattainable in the two systems alone.

(2) The positioning accuracy of the present invention is higher than the conventional integrated global positioning system/inertial navigation system alone.

(3) The system of the present invention has ability to detect the malfunction of the global positioning system satellite.

(4) Prompt and accurate ground proximity warning message is available, due to more accurate positioning solution provided by the system of the present invention.

(5) The system of the present invention reduces false ground proximity warning probability, due to a more accurate positioning solution provided by the system of the present invention.

(6) Compared with the conventional enhanced ground proximity warning systems, in the system of the present invention, an external navigation system is not required to support the ground proximity warning solution. This is especially affordable for small commercial aircraft vehicle.

Another objective of the present invention is to provide an integrated positioning/proximity warning method and system thereof, wherein position data of near vehicles from an onboard object detection system is integrated with the obtained optimal position data to warn and avoid a potential collision hazard with near objects.

Another objective of the present invention is to provide an integrated positioning/proximity warning method and system thereof, in which the information from the sensors of the positioning system and the ground proximity warning system are integrated to obtain improved performance and keep avionics affordable, in comparison with the conventional independent-solution positioning system and the ground proximity warning system. Furthermore, the present invention can be used for vehicle with no compatible source of vehicle position.

Another objective of the present invention is to provide an integrated positioning/ground proximity warning method and system thereof, in which the information from a terrain database and inertial navigation system are processed to update the level position of the inertial navigation system to improve the level position accuracy when global positioning system signals are lost.

Another objective of the present invention is to provide an integrated positioning/proximity warning method and system thereof, in which the altitude measurement from the radio altimeter and inertial navigation system and the information from the terrain database are processed to update the altitude solution of the inertial navigation system to improve the vertical navigation accuracy to meet the requirement for precise terminal approach and landing, and collision avoidance in heavy traffic airspace.

Another objective of the present invention is to provide an integrated positioning and proximity warning method and system thereof, in which the measurements from a global positioning system and an inertial navigation system are processed to update the solution of the inertial navigation system.

Another objective of the present invention is to provide an integrated positioning and proximity warning method and system thereof, in which the measurement from an inertial navigation system and a radio altimeter and the information from a terrain database are processed to perform global positioning system integrity monitoring. Another objective of the present invention is to provide an integrated positioning and proximity warning method and system thereof, in which the improved navigation solution is fed back to the global positioning system receiver to aid the tracking processing of the global positioning system signal to improve the resistance capability to jamming and high dynamic.

Another objective of the present invention is to provide an integrated positioning and proximity warning method and system thereof, in which the improved navigation solution is fed back to the global positioning system receiver to aid the acquisition and re-acquisition processing of the global positioning system signal to reduce acquisition for global positioning system first fix and re-acquisition time after the global positioning system signals are lost.

Another objective of the present invention is to provide an integrated positioning and ground proximity warning method and system thereof, in which the improved navigation solution can be used to obtain a ground proximity warning message on time.

Another objective of the present invention is to provide an integrated positioning and proximity warning method and system thereof, in which the improved navigation solution can be used to obtain a more precise ground proximity warning message.

Another objective of the present invention is to provide an integrated positioning and proximity warning method and system thereof, in which a synthetic vision system can be used to display the ground proximity warning solution and provide an extended vision field for surrounding terrain situation awareness.

Another objective of the present invention is to provide an integrated positioning and proximity warning method and system thereof, in which a voice device is equipped to provide the audible warning message to flight crew.

DETAILED DESCRIPTION OF THE PREFERRED EMBODIMENT

The present invention provides a positioning and proximity warning method and ystem thereof, which are an integrated method and system for positioning and proximity warning for a vehicle in air, land, and water, which uses information from a global positioning system, an inertial navigation system, a baro altimeter, a radio altimeter, a terrain database, a vehicle control and management system, and an object detection system.

The first embodiment of the present invention is disclosed as an integrated positioning and ground proximity warning method and system, as follows.

Figure 1:
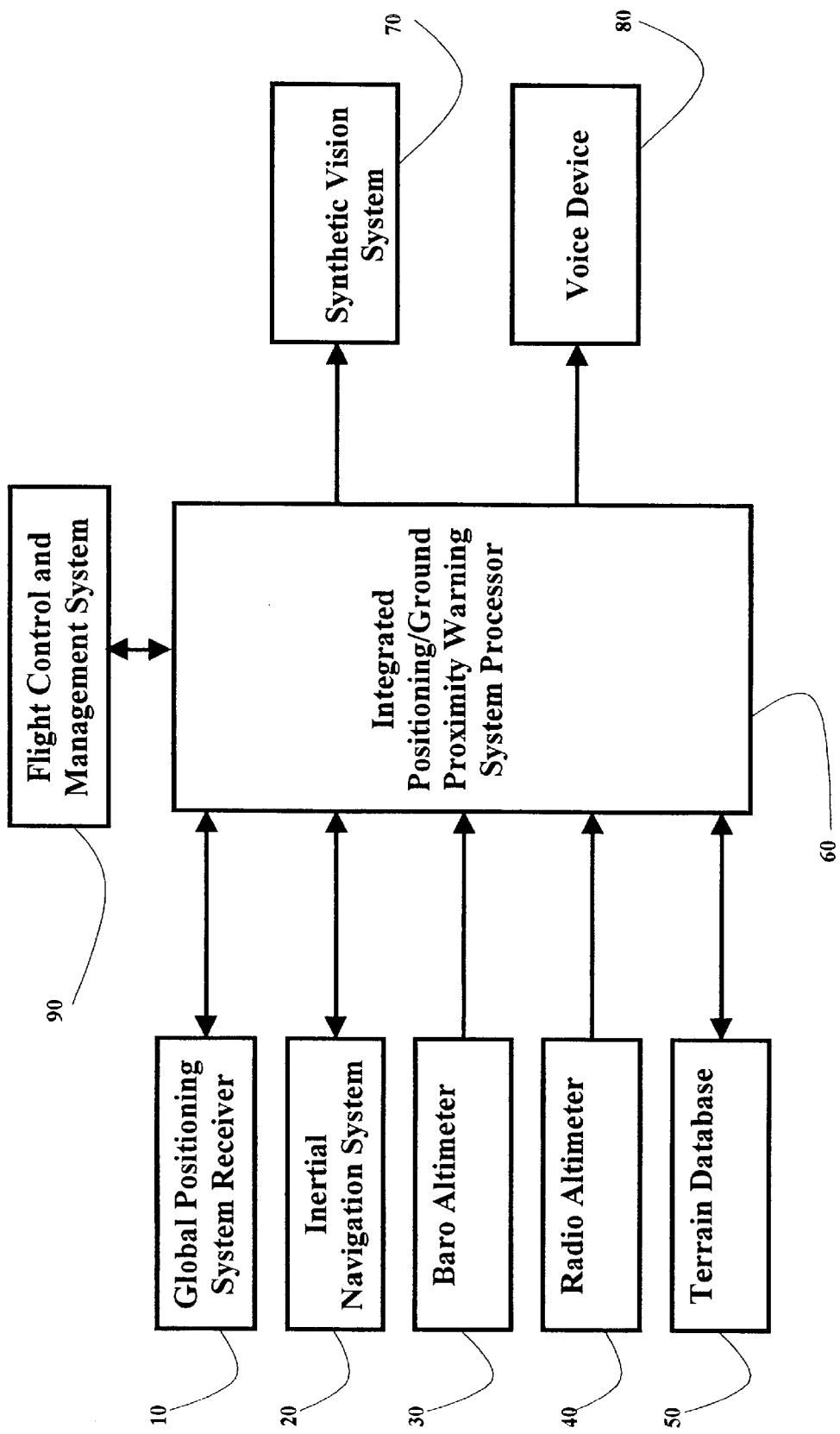
FIG. 1 is a block diagram illustrating an integrated positioning and ground proximity warning method and system according to the first embodiment of the system of the present invention.

Referring to FIG. 1, the integrated positioning and ground proximity warning system comprises a global positioning system receiver 10, an inertial navigation system 20, a baro altimeter 30, a radio altimeter 40, a terrain database 50, and a positioning/ground proximity warning system processor 60.

The global positioning system receiver 10 receives global positioning system signals and deriving position, velocity and time information or pseudorange and delta range measurements of the global positioning system.

The inertial navigation system 20 solves navigation equations with angular rate and specific force information from an inertial measurement unit and obtaining an inertial navigation solution.

The baro altimeter 30 provides baro altitude measurements. The radio altimeter 40 provides radio altitude measurement from the terrain surface. The terrain database 50 provides global terrain data and obtains the terrain height of the current vehicle position and surrounding terrain height data.

The positioning/ground proximity warning system processor 60 receives data from the global positioning system receiver 10, the inertial navigation system 20, the baro altimeter 30, the radio altimeter 40, and the terrain database 50. The positioning/ground proximity warning system processor 60 also receives vehicle performance and configuration data from an onboard flight control and management system 90 and providing optimal position, velocity, attitude navigation information, and an optimal ground proximity warning information.

The global positioning system receiver 10 is connected with the integrated positioning/ground proximity warning processor 60. The inertial navigation system 20 is connected with the integrated positioning/ground proximity warning processor 60. The baro altimeter 30 is connected with the integrated positioning/ground proximity warning processor 60. The radio altimeter 40 is connected with the integrated positioning/ground proximity warning processor 60. The terrain database 50 is connected with the integrated positioning/ground proximity warning processor 60.

A synthetic vision system 70 can be connected with the positioning/ground proximity warning system processor 60 to provide the flight crew with an enhanced vision field display for the ground proximity warning.

A voice device 80 can be connected with the positioning/ground proximity warning system processor 60 to provide the flight crew with audible ground proximity warning messages.

The global position system receiver 10 may be selected as a differential global position system receiver or as a multi-antenna global position system receiver or as a global position system receiver with wide area augmentation.

The terrain database 50 may be selected as:

An onboard terrain database.

A ground-based terrain database, which is accessed through a data link by the integrated positioning and ground proximity warning system.

Referring to FIG. 1, the connection between the global position system 10, the inertial navigation system 20, the baro altimeter 30, the radio altimeter 40, the terrain database 50, the integrated positioning/ground proximity warning system processor 60, the synthetic vision system 70, the voice device 80, and the onboard flight control and management system 90 can be one of the following means:

(1) Bus-based structure, such as inter bus, MIL-1553, ARIC 429.

(2) Communication port-based structure, including synchronous communication interface and synchronous communication interface, such as RS-232, RS422, RS-485, etc.

(3) Network-based structure, such as NE2000.

Figure 8:
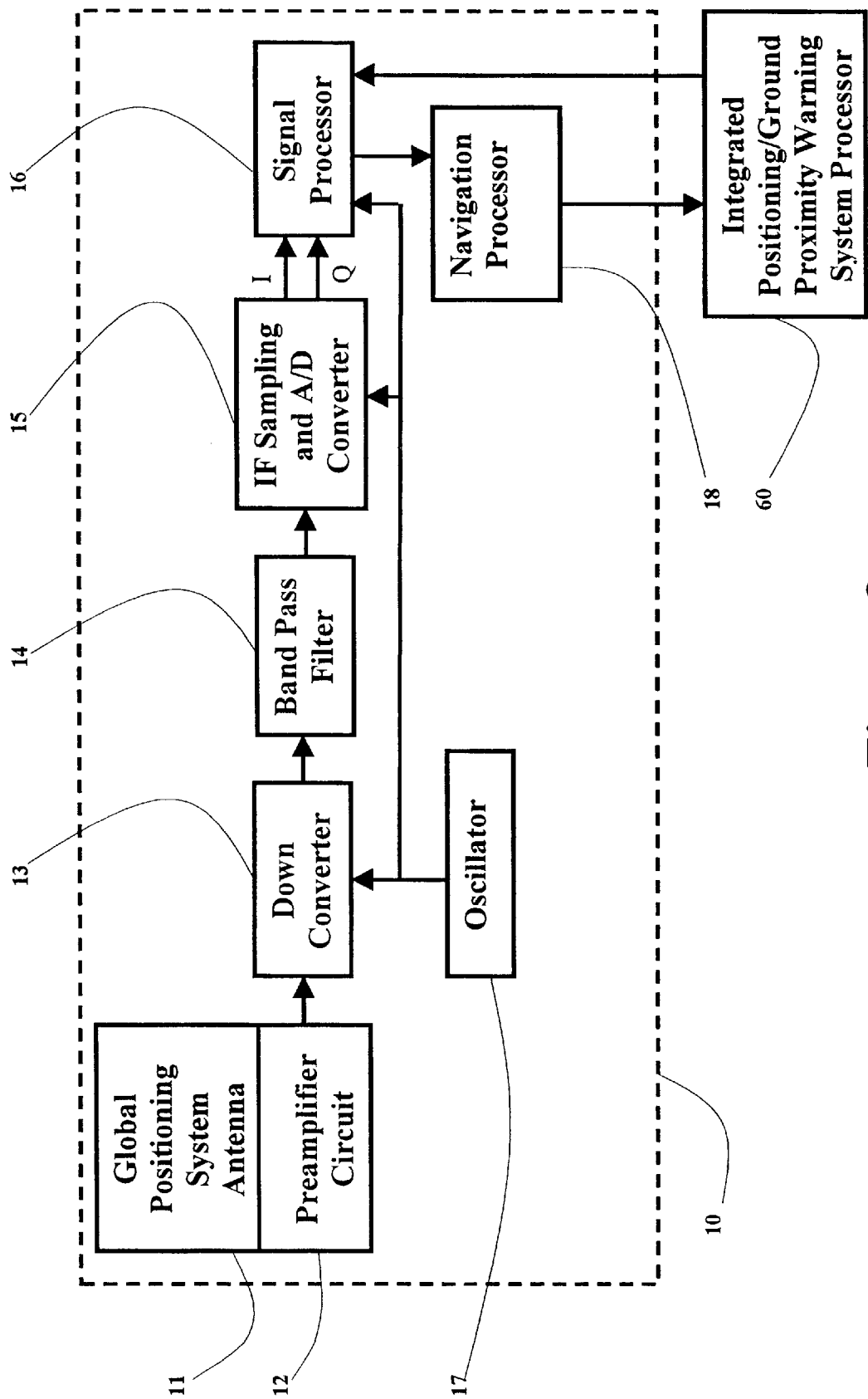
FIG. 8 is a block diagram illustrating the global positioning system receiver.

Referring to FIG. 1 and FIG. 8, the global positioning system receiver 10, which is connected with the integrated positioning/ground proximity warning processor 60, comprises a navigation processor 18 adapted for providing the following two types of data to the integrated positioning/ ground proximity warning system processor 60:

1) Vehicle position, velocity, and time information.

2) Global positioning system receiver's raw measurements: pseudorange, delta range measurements, and satellite ephemeris of the global positioning system.

A signal processor 16 receives the optimal vehicle position, velocity, acceleration, and attitude solution data from the integrated positioning/ground proximity warning system processor 60 to aid the signal tracking, acquisition, and reacquisition processing of the global positioning system.

The global positioning system receiver 10 further comprises a global positioning system antenna 11, which is connected with a preamplifier circuit 12. The global positioning system antenna 11 receives radio frequency (RF) signal of the global positioning system and outputs the received RF signals to the preamplifier circuit 12.

The preamplifier circuit 12 is connected between the global positioning system antenna 11 and a down converter 13, and amplifies the input RF signal of the global positioning system to improve the signal-noise ratio, and outputs the amplified RF signal of the global positioning system to the down converter 13.

The down converter 13 is connected between the preamplifier 12 and a band pass filter 14, and converts down the input RF signal of the global positioning system to the intermediate frequency (IF) signal, and outputs the IF signal to the band pass filter 14.

The band pass filter 14 is connected between the down converter 13 and an IF sampling and A/D converter 15 and filters out the noise of the input IF signal to improve the signal-noise ratio, and sends the filtered IF signal to the IF sampling and A/D) convert 15.

The IF sampling and A/D converter 15 is connected between the band pass filter 14 and a signal processor 16, and sample the input IF signal, which is an analog signal. The IF sampling and A/D converter 15 outputs the digital in-phase (I) and quadraphase (Q) to the signal processor 16.

The signal processor 16 is connected between the IF sampling and A/D converter 15 and a navigation processor 18. The signal processor 16 receives a digital in-phase (I) and quadraphase (Q) from the IF sampling and A/D converter 15 and receives the optimal vehicle position, velocity, acceleration, and attitude solution data from the integrated positioning/ground proximity warning system processor 60, and performs the signal acquisition, tracking, and reacquisition processing which is aided by the data from the integrated positioning/ground proximity warning system processor 60, and outputs the pseudorange, delta range, and satellite ephemeris of the global positioning system to the navigation processor 18.

The navigation processor 18 is connected with the signal processor 16, and solves navigation solution using the input pseudorange, delta range, and satellite ephemeris of the global positioning system from the signal processor 16, and provides the following two types of data to the integrated positioning/ground proximity warning system processor 60:

1) The vehicle position, velocity, and time information.
2) The global positioning system receiver's raw measurements: pseudorange, delta range measurements, and satellite ephemeris of the global positioning system.

An oscillator 17 is connected with the down converter 13, the IF sampling and A/D converter 15, and the signal processor 16 to provide the local reference signals.

Figure 9:
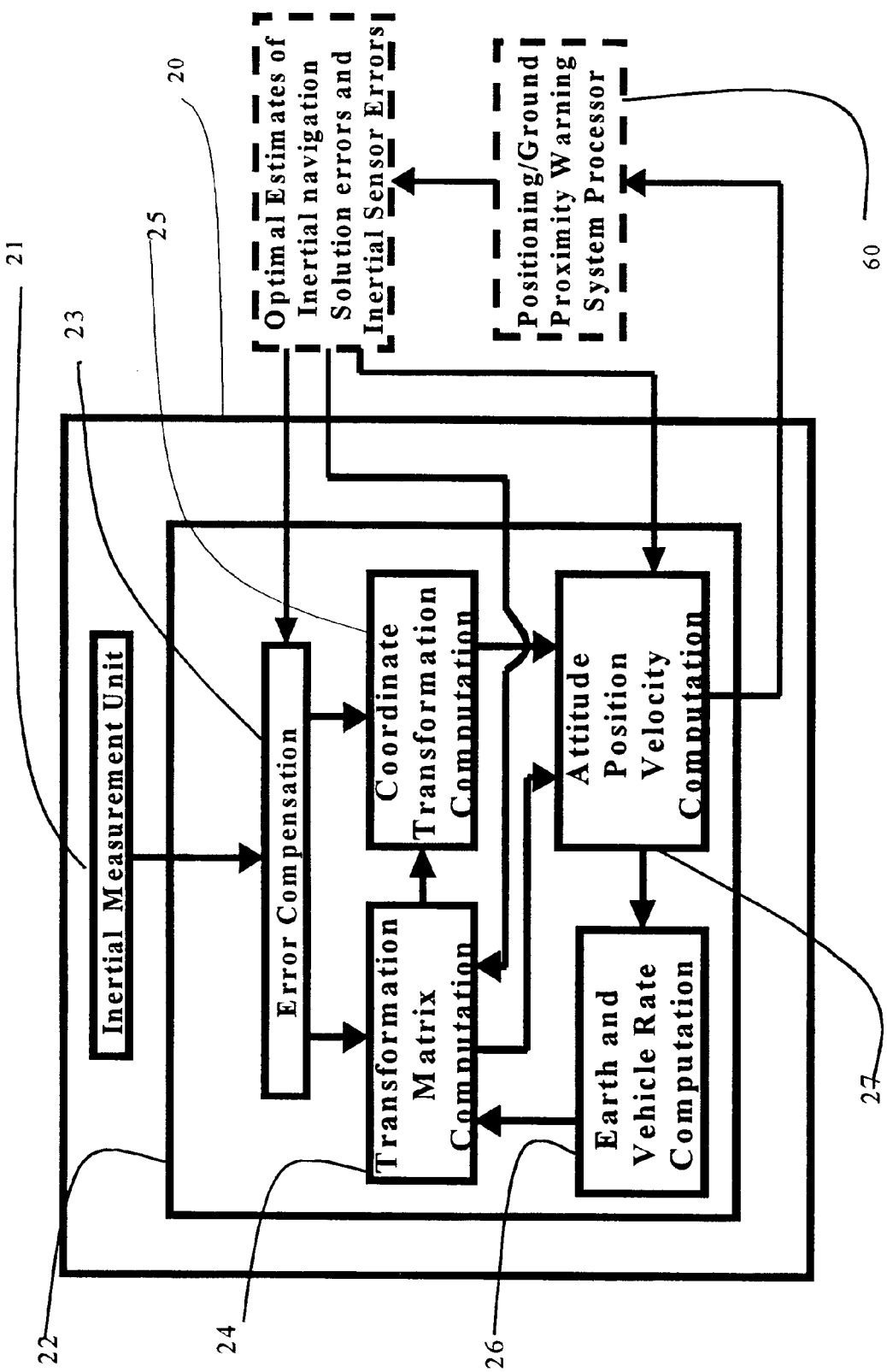
FIG. 9 is a block diagram illustrating the inertial navigation system 20.

Referring to FIG. 1 and FIG. 9, the inertial navigation system 20, which is connected with the integrated positioning/ground proximity warning system processor 60, and receives an optimal estimates of inertial navigation solution errors and inertial sensor errors from the integrated positioning/ground proximity warning system processor 60, and outputs the inertial navigation solution, such as position, velocity and attitude to the integrated positioning/ground proximity warning system processor 60.

The inertial navigation system 20 further comprises an inertial measurement unit 21 and an inertial navigation processor 22. The inertial measurement unit 21 is connected with the inertial navigation processor 22 to provide measured body angular rates and specific force.

The inertial navigation processor 22 comprises the following processing modules:

An error compensation 23 receives the body angular rates and specific forces from the inertial measurement unit 21, which are sensed by the gyros and accelerometers of the inertial measurement unit 21, and optimal estimates of inertial sensor errors from the integrated positioning/ground proximity warning system processor 60, and calibrates the error of the body angular rates and specific forces. The error compensation 23 outputs the compensated body angular rates to a transformation matrix computation 24, and outputs the compensated body specific forces to a coordinate transformation computation 25.

The transformation matrix computation 24 receives compensated body angular rates from the error compensation 23, and the rotation rate vector of the local navigation frame (n frame) relative to the inertial frame (i frame) from an earth and vehicle rate computation 26, and the optimal estimates of attitude errors from the integrated positioning/ground proximity warning system processor 60, and updates a transformation matrix from the body frame (b frame) to the n frame, and the removes attitude errors. The way to update the attitude matrix is by the Euler method, or the direction cosine method, or the quaternion method. The transformation matrix computation 24 outputs the transformation matrix to the coordinate transformation computation 25 and an attitude is position velocity computation 27.

The coordinate transformation computation 25 receives a compensated specific force from the error compensation 23 and the transformation matrix from the transformation matrix computation 24, and transforms the specific force expressed in the body frame to the specific force expressed in the navigation frame, and outputs the specific force expressed in the navigation frame to the attitude position velocity computation 27.

The attitude position velocity computation 27 receives the specific force expressed in the navigation frame from the coordinate transformation computation 25, and the updated transformation matrix from the transformation matrix computation 24, and the optimal estimates of position errors and velocity errors from the integrated positioning/ground proximity warning system processor 60, and computes the position, velocity, and attitude, and removes the errors of the position and velocity, and outputs the inertial navigation solution to the Earth and vehicle rate computation 26 and the integrated positioning/ground proximity warning system processor 60.

The Earth and vehicle rate computation 26 receives the inertial navigation solution from the attitude position velocity computation 27, and computes a rotation rate vector of the local navigation frame (n frame) with respect to the inertial frame (i frame), and outputs the rotation rate vector of the local navigation frame (n frame) with respect to the inertial frame (i frame) to the transformation matrix computation 24.

Referring to FIG. 1, the baro altimeter 30, which is connected with the integrated positioning/ground proximity warning system processor 60, senses air pressure, and computes the baro altitude measurements, and outputs the baro altitude measurements to the integrated positioning/ground proximity warning system processor 60.

Referring to FIG. 1, the radio altimeter 40, which is connected with the integrated positioning/ground proximity warning system processor 60, transmits radio signal, and receives the echoes of the radio from the terrain surface, and measures the time delay between transmission and reception of the radio signal, and transforms the time delay to the radio altitude measurement, and outputs the radio altitude measurement to the integrated positioning/ground proximity warning system processor 60.

Referring to FIG. 1, the terrain database 50, which is connected with the integrated positioning/ground proximity warning system processor 60, receives the query parameters of the database from the integrated positioning/ground proximity warning system processor 60, and outputs the terrain height data of the current vehicle position and surrounding area to the integrated positioning/ground proximity warning system processor 60.

Figure 2:
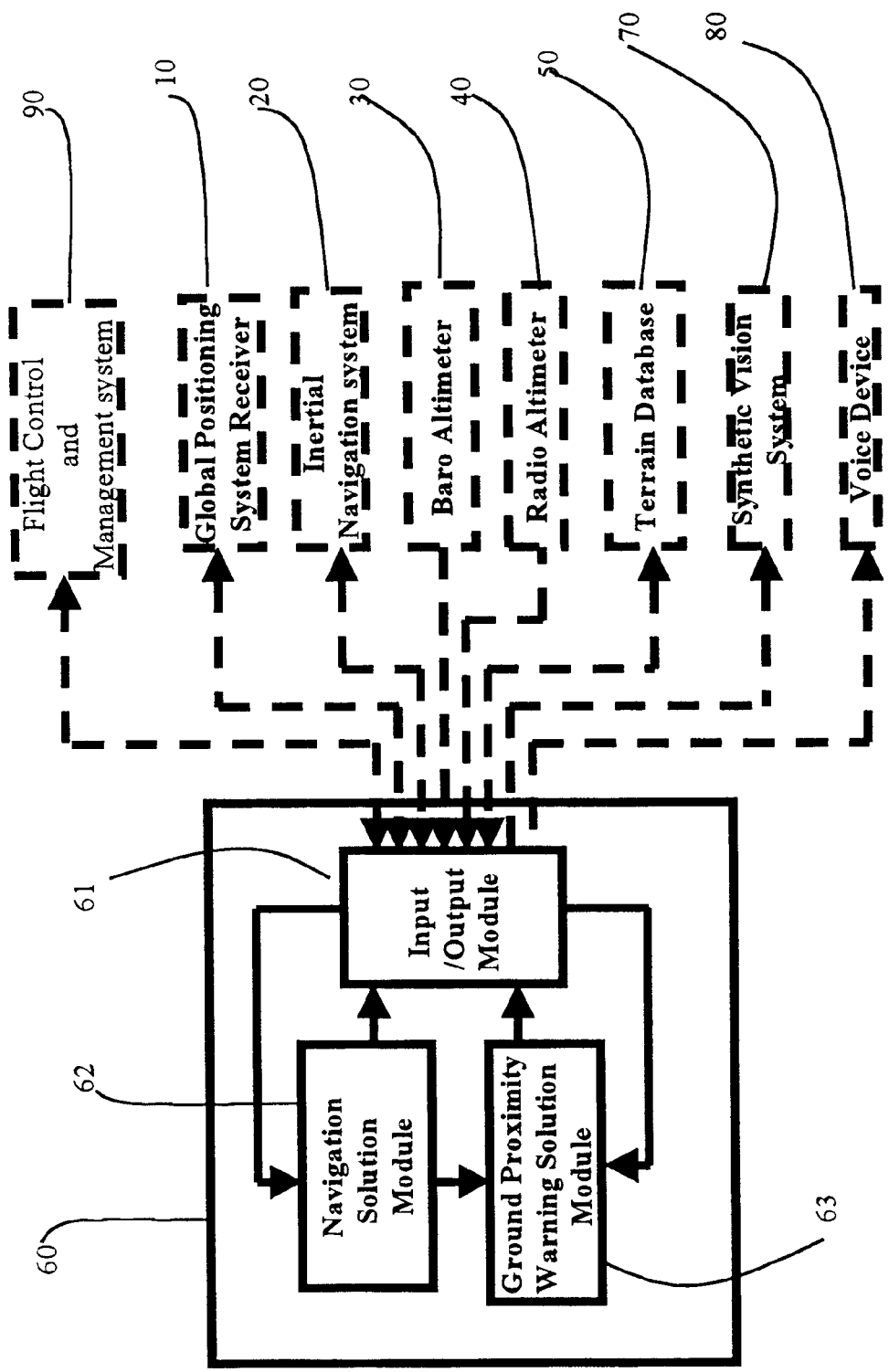
FIG. 2 is a block diagram illustrating an integrated positioning/ground proximity warning processor 60.

Referring to FIG. 2, the integrated positioning/ground proximity warning system processor 60 comprises the following modules:

An input/output module 61 manages the input and output of data from other devices and the onboard flight control and management system 90.

A navigation solution module 62 is connected with the input/output module 61 and a ground proximity warning solution module 63. The navigation solution module 62 fuses the information from all sensors of the system of the present invention to obtain an optimal navigation solution, and outputs the obtained optimal navigation solution to the onboard flight control and management system 90 and the ground proximity warning solution module 63, and outputs optimal position and velocity to the global positioning system receiver 10, and outputs optimal estimates of inertial navigation solution error and inertial sensor errors to the inertial navigation system 20.

Figure 3:
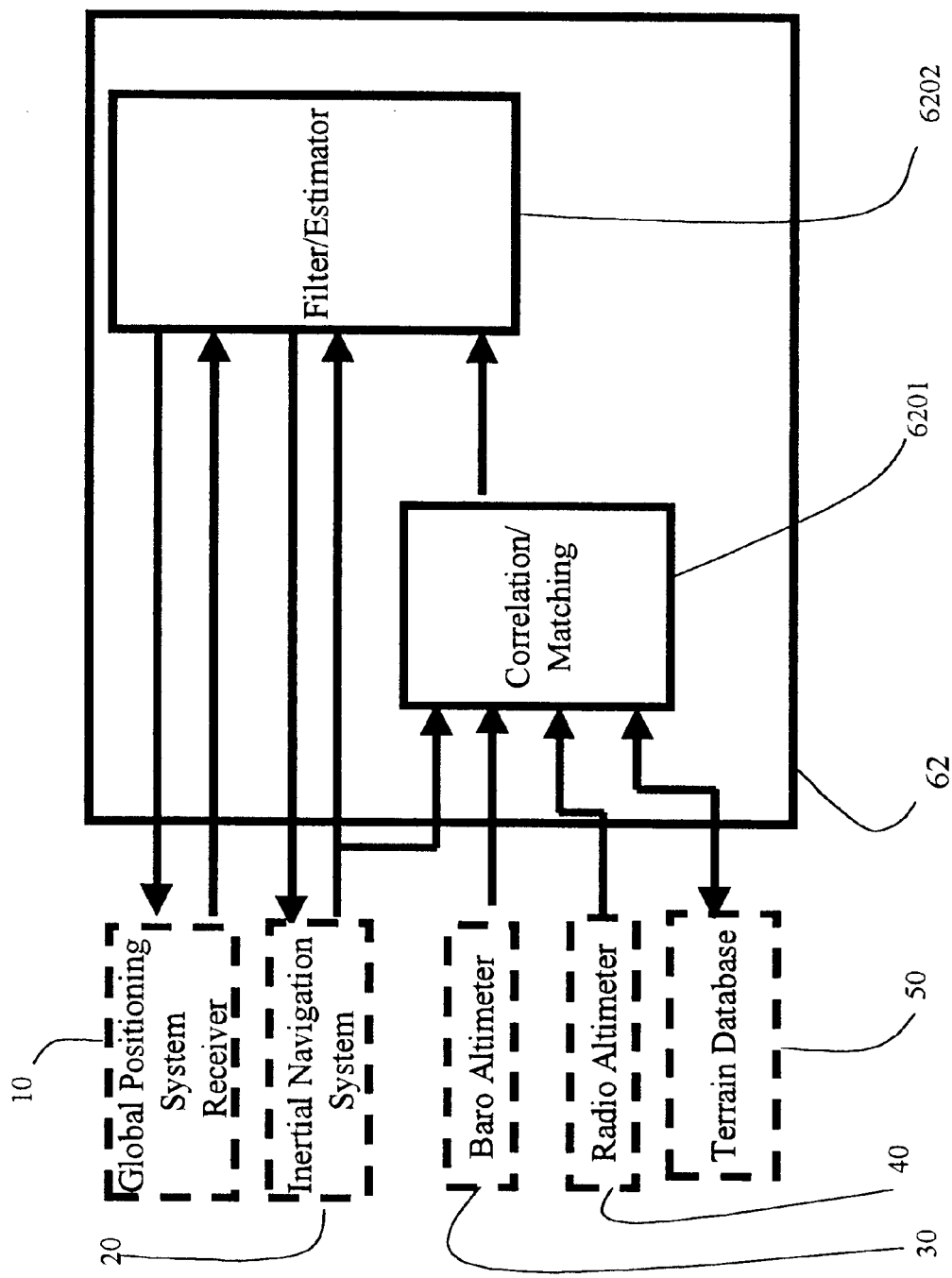
FIG. 3 is a block diagram illustrating the 6(a) realization of the navigation solution module 62.

To obtain different degrees of performance of the system of the present invention, the navigation solution module 62 may be realized in the following ways:

6(a). Referring to FIG. 3, a correlation/matching 6201 accepts individual radio altimeter measurements from the radio altimeter 40, barometric altimeter measurements from the baro altimeter 30, and terrain data from the terrain database 50 through the input/output module 61. The individual radio altimeter measurements and barometric altimeter measurements are collected to construct a measured profile of terrain in an assigned time window. The terrain data is collected to construct a set of prestored reference terrain profiles which correspond to the area over which the vehicle is flying during the assigned window time. The measured terrain profile is then compared with the set of prestored reference terrain profiles in the correlation/matching 6201. Once a match is found, the correlation/matching 6201 outputs the geographic coordinates of the best matching reference profile to a filter/estimator 6202.

In addition, the correlation/matching 6201 differences the result of adding radio altimeter measurements with terrain height of the current vehicle position with the inertial altitude solution (or hybrid baro/inertial altitude measurement) to form altitude measurement residues to the filter/estimator 6202.

The filter/estimator 6202 filters the measurements for the global positioning system receiver 10, the inertial navigation solution from the inertial navigation system 20, and the geographic coordinates of the best matching reference profile and altitude measurement residues from the correlation/matching 6201 to obtain optimal estimates of the inertial navigation solution errors, errors of the global position system receiver, and errors of inertial sensors in a centralized filtering fashion. The optimal positioning solution can be obtained using the following two methods:

6(a)-1. The filter/estimator 6202 compensates the inertial navigation solution from the inertial navigation system 20 with the optimal estimates of the navigation solution errors.

6(a)-2. The inertial navigation system 20 accepts the fed back optimal estimates of the inertial navigation solution errors and the inertial sensor errors to calibrate the errors.

Figure 4:
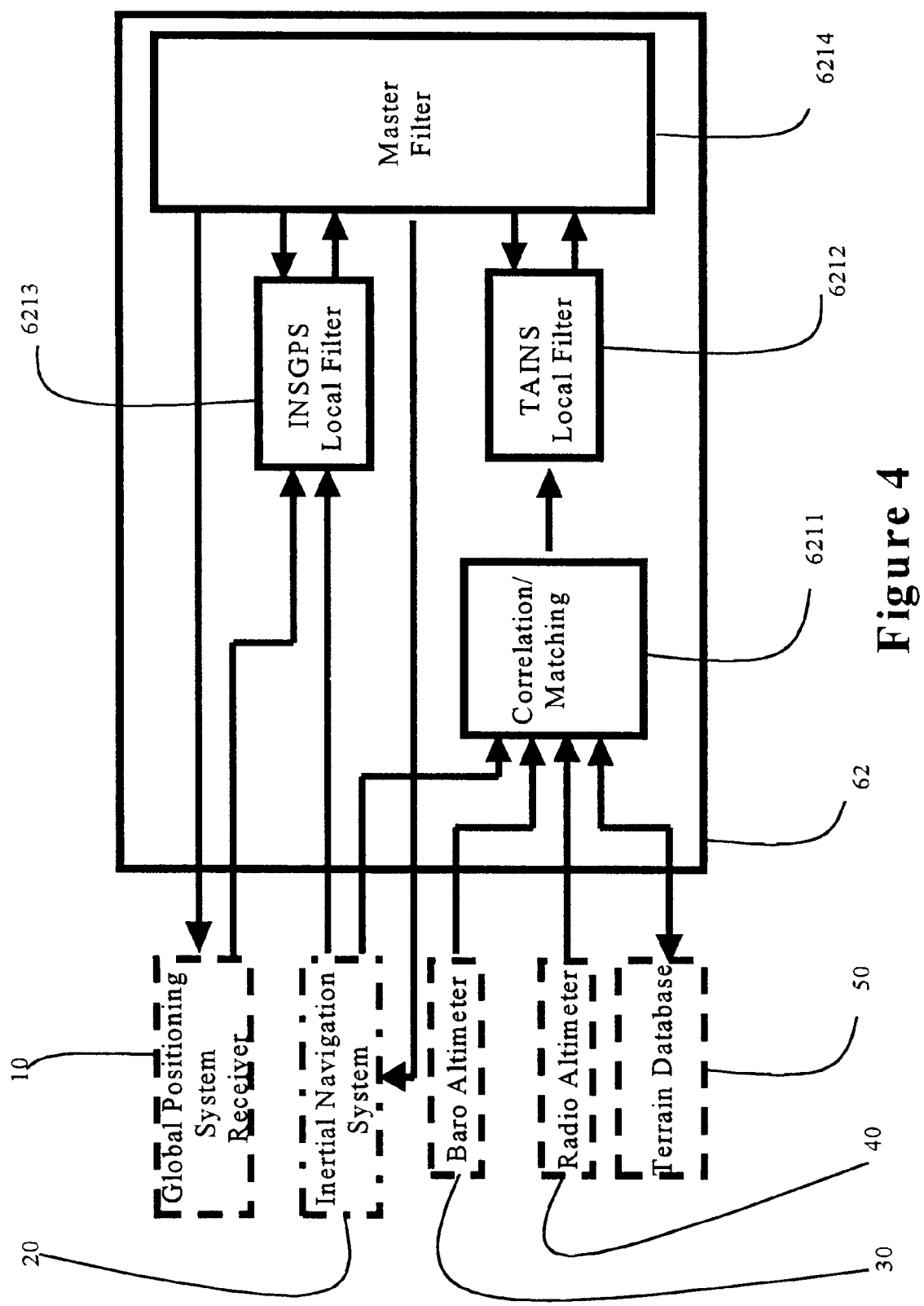
FIG. 4 is a block diagram illustrating the 6(b) realization of the navigation solution module 62.

6(b) Referring to FIG. 4, the correlation/matching 6211 accepts individual radio altimeter measurements from the radio altimeter 40, barometric altimeter measurements from the baro altimeter 30, and terrain data from the terrain database 50 through the input/output module 61. The individual radio altimeter measurements and barometric altimeter measurements are collected to construct a measured profile of terrain in an assigned time window. The terrain data is collected to construct a set of prestored reference terrain profiles which correspond to the area over which the vehicle is flying during the assigned window time. The measured terrain profile is then compared with the set of prestored reference terrain profiles in the correlation/matching 6211. Once a match is found, the correlation/matching 6211 outputs the geographic coordinates of the best matching reference profile to a TAINS local filter 6212.

In addition, the correlation/matching 6211 differences the result of adding radio altimeter measurements with terrain height of the current vehicle position with the inertial altitude solution (or hybrid baro/inertial altitude measurement) to form altitude measurement residues to the TAINS local filter 6212.

The TAINS local filter 6212 models the inertial navigation solution errors and inertial sensor errors, and filters the geographic coordinates of the best matching reference profile and altitude measurement residues to obtain the local optimal estimates of inertial navigation solution errors and inertial sensor errors.

An INSGPS local filter 6213 inputs the measurements from the global positioning system receiver 10 and the inertial navigation solution from the inertial navigation system 20 to obtain the local optimal estimates of inertial navigation solution errors, global position system receiver errors, and inertial sensor errors.

A master filter 6214 receives the local optimal estimates and covariance matrix of inertial navigation solution errors, errors of the global position system receiver, and errors of the inertial sensor from the INSGPS local filter 6213 and the local optimal estimates and covariance matrix of the inertial navigation solution errors and errors of the inertial sensor from the TAINS local filter 6212, and filters these data, and provides the global optimal estimates of inertial navigation solution errors, the global position system receiver errors, and the inertial sensor errors.

The INSGPS local filter 6213 and the TAINS local filter 6212 accepts the fed back global optimal estimates of inertial navigation solution errors, the global position system receiver errors, and the inertial sensor errors and the covariance matrix obtained by the master filter 6214 to reset the INSGPS local filter 6213 and the TAINS local filter 6212 and performs information-sharing among the master filter 6214, the INSGPS local filter 6213, and the TAINS local filter 6212.

To obtain different system performances, the communication and estimation between the master filter 6214, the INSGPS local filter 6213, and the TAINS local filter 6212 may have different approaches.

The master filter 6214 can also perform the consistency test among the state estimates of the master filter 6214, the INSGPS local filter 6213 and the TAINS local filter 6212, to detect and isolate the malfunction of a satellite of the global positioning system and to reconfigure the structure and process of the navigation solution module 62.

The optimal positioning solution can be obtained using the following two methods:

6(b)-1. The master filter 6214 compensates the inertial navigation solution from the inertial navigation system 20 with the optimal estimates of the navigation solution errors.

6(b)-2. The inertial navigation system 20 accepts the fed back optimal estimates of the inertial navigation solution errors and the inertial sensor errors to calibrate the errors.

Figure 5:
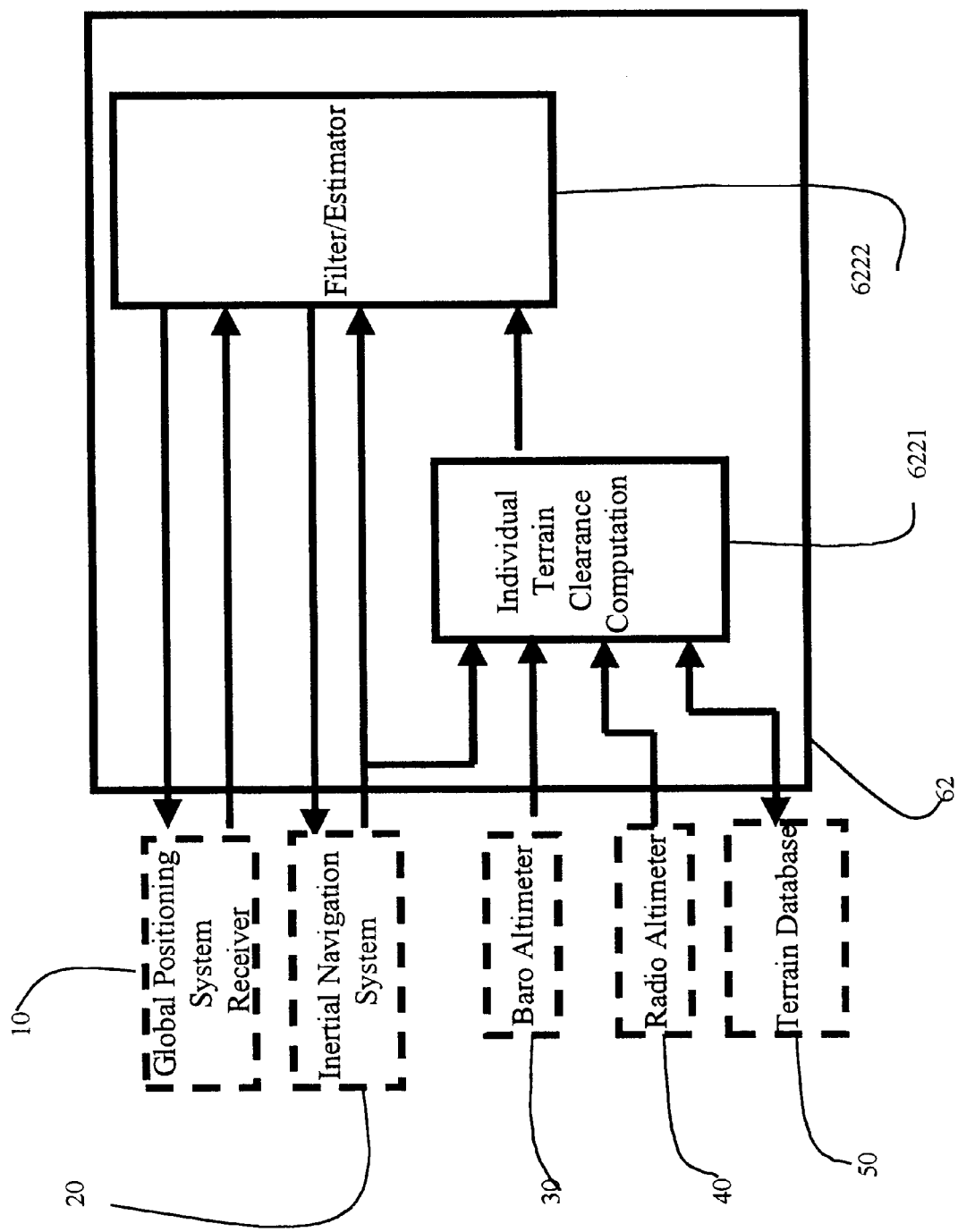
FIG. 5 is a block diagram illustrating the 6(c) realization of the navigation solution module 62.

6(c). Referring to FIG. 5, an individual terrain clearance computation 6221 accepts the inertial navigation solution from the inertial navigation system 20, the baro altitude measurement from the baro altimeter 30, the radio altitude measurement from the radio altimeter 40, and terrain data from the terrain database 50.

The individual baro altitude measurements (or hybrid baro/inertial altitude measurement) is subtracted by the height of terrain at the current position to form the referenced individual terrain-clearance measurement. The radio altitude measurement is the individual measured terrain-clearance measurement. The individual terrain clearance computation 6221 outputs the deference between the measured terrain-clearance measurement and a referenced terrain-clearance measurement to a filter/estimator 6222.

Due to the undulating nature of terrain, the terrain-clearance measurement is a nonlinear function of vehicle position. Furthermore, the difference between the measured terrain-clearance measurement and the referenced terrain-clearance measurement is a function of the inertial navigation solution errors.

The terrain clearance measurement equation is theoretically a nonlinear function of the antenna pattern of the radio altimeter 40, the cross-range/downrange position, altitude, and attitude of the vehicle. Generally, a reasonable approximation to the k th referenced terrain clearance measurement is $$TC_k = h_{INS} - h(X_k, Y_k) + v_k \qquad (1)$$

where, $TC_k$ is the k th referenced terrain clearance measurement; $h_{INS}$ is the height of the vehicle indicated by the inertial navigation system 20 or hybrid baro/inertail altitude measurement; $h(X_k, Y_k)$ is the height of the terrain at the position (X,Y) indicated by the inertial navigation system 20; $v_k$ is the error of the terrain database 50.

The filter/estimator 6222 filters the measurements for the global positioning system receiver 10, the inertial navigation solution from the inertial navigation system 20, and the difference between the measured terrain-clearance measurement and referenced terrain-clearance measurement from the individual terrain clearance computation 6221 in a centralized filtering fashion to obtain optimal estimates of the inertial navigation solution errors, the global position system receiver errors, and the inertial sensor errors.

Because the $h(X_k, Y_k)$ is a nonlinear function of the position (X,Y), the filter/estimator 6222 is a nonlinear filter/estimator.

The optimal positioning solution can be obtained using the following two methods:

6(c)-1. The filter/estimator 6222 compensates the inertial navigation solution from the inertial navigation system 20 with the optimal estimates of the navigation solution errors.

6(c)-2. The inertial navigation system 20 accepts the fed back optimal estimates of the inertial navigation solution errors and the inertial sensor errors to calibrate the errors.

Figure 6:
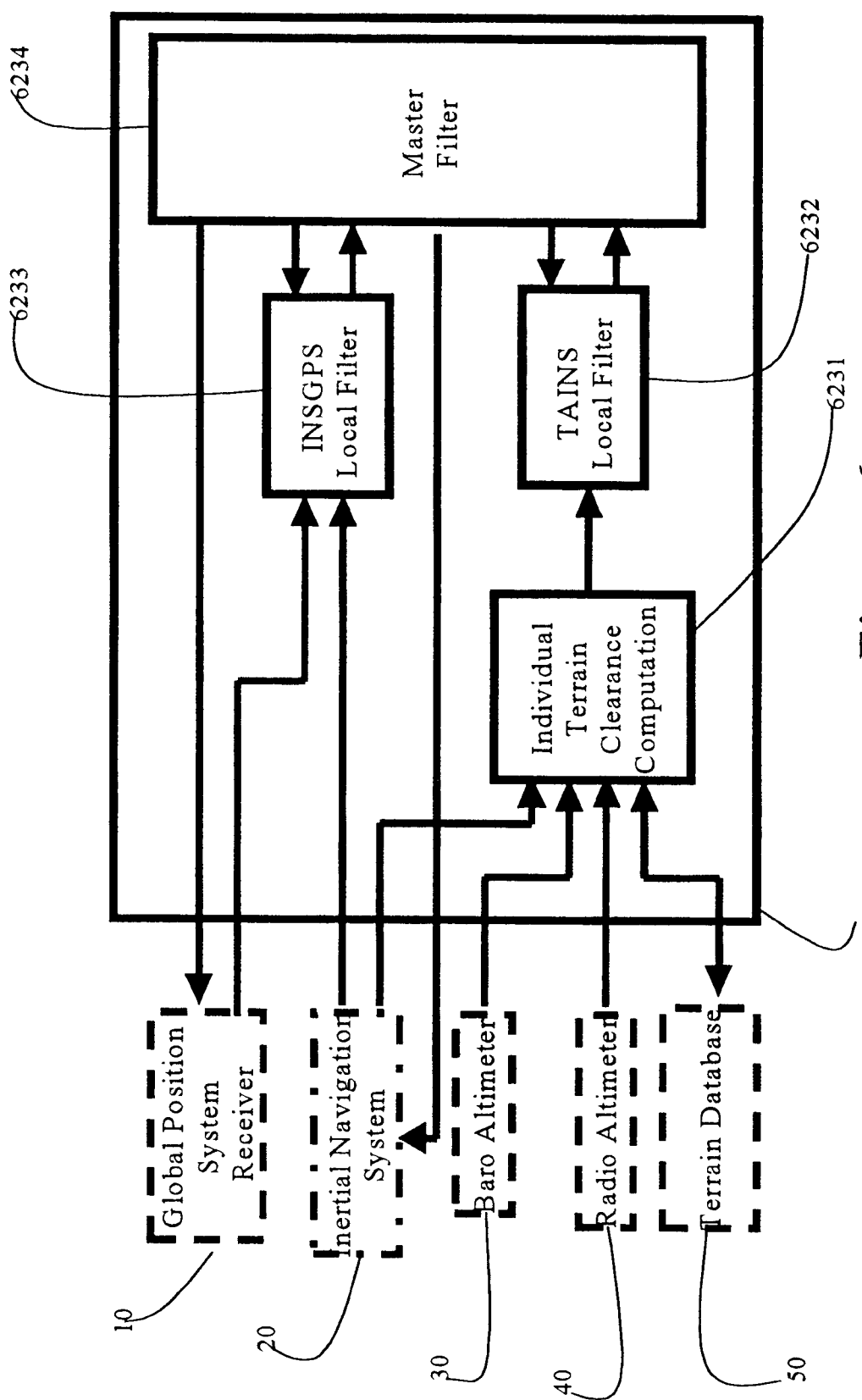
FIG. 6 is a block diagram illustrating the 6(d) realization of the navigation solution module 62.

6(d). Referring to FIG. 6, an individual terrain clearance computation 6231 accepts the inertial navigation solution from the inertial navigation system 20, the baro altitude measurement from the baro altimeter 30, the radio altitude measurement from the radio altimeter 40, and terrain data from the terrain database 50. The individual baro altitude measurements (or hybrid barolinertail altitude measurement) is subtracted by the height of terrain at the current position to form the referenced individual terrain-clearance measurement. The radio altitude measurement is the individual measured terrain-clearance measurement. The individual terrain clearance computation 6231 outputs the difference between the measured terrain-clearance measurement and the referenced terrain-clearance measurement to a TAINS local filter 6232.

The TAINS local filter 6232 models the inertial navigation solution errors and inertial sensor errors, and filters the difference between the measured terrain-clearance measurement and the referenced terrain-clearance measurement to obtain the local optimal estimates of inertial navigation solution errors and inertial sensor errors.

Because the $h(X_k, Y_k)$ is a nonlinear function of the position (X,Y), the TAINS local filter 6232 is a nonlinear filter/estimator or extended Kalman filter.

An INSGPS local filter 6233 accepts and filters the measurements of GPS from the global positioning system receiver 10 and the inertial navigation solution from the inertial navigation system 20 to obtain the local optimal estimates of inertial navigation solution errors, the global position system receiver errors, and the inertial sensor errors.

The master filter 6234 receives the local optimal estimates and covariance matrix of the inertial navigation solution errors, the global position system receiver errors, and the inertial sensor errors from the INSGPS local filter 6233 and the local optimal estimates and covariance matrix of the inertial navigation solution errors and the inertial sensor errors from the TAINS local filter 6232 and processes these data, and provides the global optimal estimates of inertial navigation solution errors, global position system receiver errors, and inertial sensor errors.

The INSGPS local filter 6233 and the TAINS local filter 6232 accepts the fed back global optimal estimates of inertial navigation solution errors, the global position system receiver errors, and the inertial sensor errors and the covariance matrix obtained by the master filter 6234 to reset the INSGPS local filter 6233 and the TAINS local filter 6232 and performs information-sharing among the master filter 6234, the INSGPS local filter 6233, and the TAINS local filter 6232.

To obtain different system performance, the communication and estimation among the master filter 6234, the INS-GPS local filter 6233, and the TAINS local filter 6232 may have different approaches.

The master filter 6234 can also perform the consistency test among the state estimates of the master filter 6234, the INSGPS local filter 6233, and the TAINS local filter 6232 to detect and isolate the malfunction of the satellite of the global positioning system and to reconfigure the structure and process of the navigation solution module.

The optimal positioning solution can be obtained by using the following two methods:

6(d)-1. The master filter 6234 compensates the inertial navigation solution from the inertial navigation system 20 with the optimal estimates of the navigation solution errors.

6(d)-2. The inertial navigation system 20 accepts the fed back optimal estimates of the inertial navigation solution errors and the inertial sensor errors to calibrate the errors.

Figure 7:
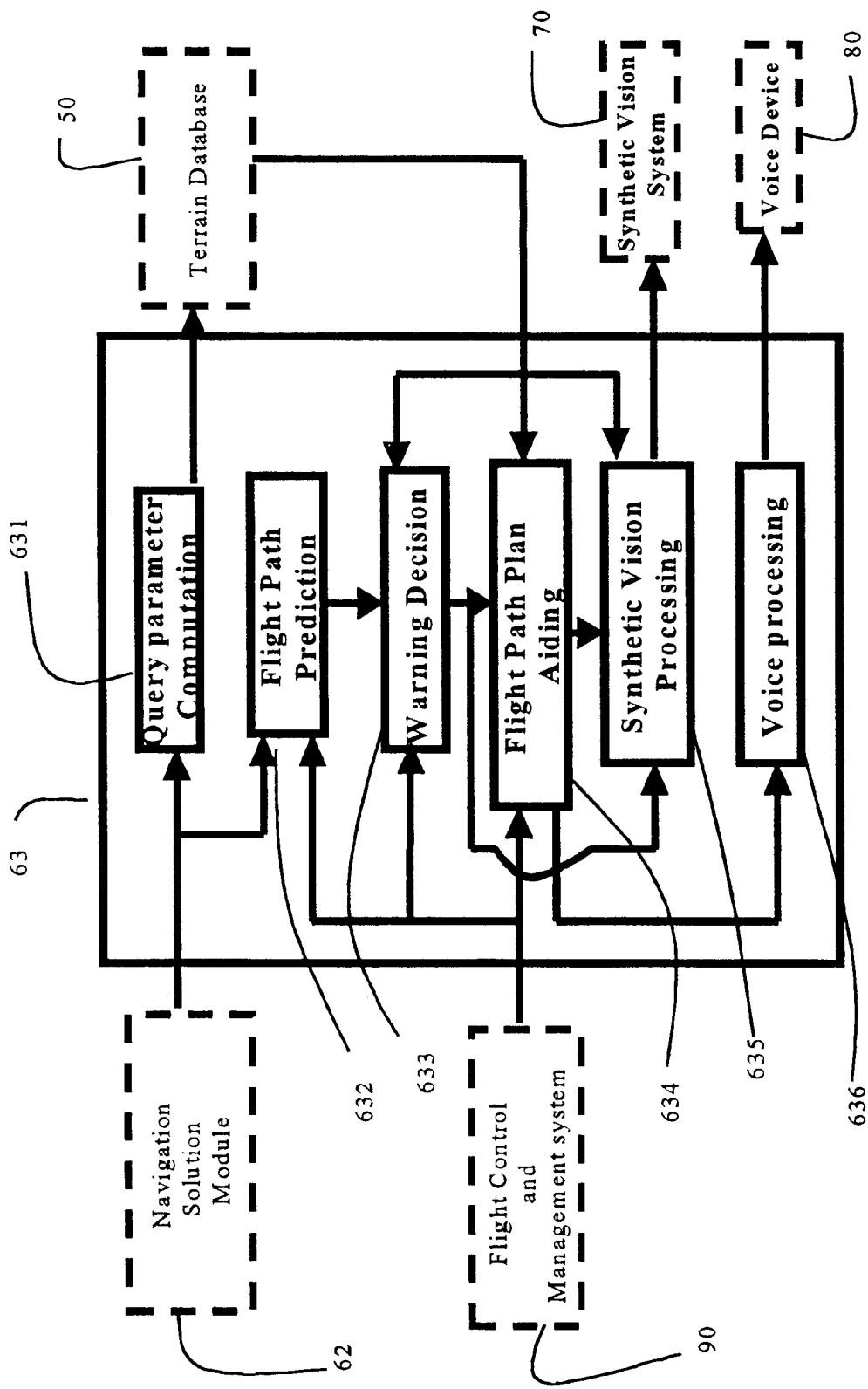
FIG. 7 is a block diagram illustrating the ground proximity warning solution module 63.

Referring to FIG. 7, the ground proximity warning solution module 63 further comprises a query parameter computation 631, a flight path prediction 632, a warning decision 633, a flight path plan aiding 634, a synthetic vision processing 635, and a voice processing 636.

The query parameter computation 631 receives the optimal navigation solution from the navigation solution module 62, computes the query parameters, and outputs the query parameters to the terrain database 50 to access the terrain data of the current vehicle position and surrounding terrain.

The flight path prediction 632 receives and collects the optimal navigation solution from the navigation solution module 62, and receives the vehicle performance and configuration data from the onboard flight control and management system 90, and predicts the projected flight path to a warning decision 633. In addition, The flight path prediction 632 passes the current vehicle position, velocity, and attitude to the warning decision 633.

The warning decision 633 receives the projected flight path from the flight path prediction 632, the vehicle performance and configuration data from the onboard flight control and management system 90, such as glide slope, landing gear, etc., and the surrounding terrain data from the terrain database 50. If the projected flight path is too close to the terrain, the warning decision 633 makes a warning decision message which are sent to a flight path plan aiding 634, a synthetic vision processing 635 and a voice processing 636. In addition, the warning decision 633 passes the current vehicle position, velocity, and attitude to the flight path plan aiding 634.

The flight path plan aiding 634 receives the warning decision message and the current vehicle position, velocity, and attitude information from the warning decision 633, the surrounding terrain data from the terrain database 50, and the vehicle performance and configuration data from the onboard flight control and management system 90, and processes these data, and provides an optimal evasion flight path to aid the flight crew.

The synthetic vision processing 635 receives the projected flight path and warning decision message from the warning decision 633, the surrounding terrain data from the terrain database 50, and the suggested optimal evasion flight path from the flight path plan aiding 634, and provides the driving data to the synthetic vision system 70.

The voice processing 636 receives the projected flight path and warning decision message from the warning decision 633, the surrounding terrain data from the terrain database 50, and the suggested optimal evasion flight path from the flight path plan aiding 634, and provides the driving data to the voice device 80.

Referring to FIG. 1, the integrated positioning and ground proximity warning method comprises the following steps:

1. Receive global positioning system signals for deriving position, velocity and time information or pseudorange and delta range measurements of the global positioning system, which are output to an integrated positioning/ground proximity warning system processor.

2. Receive vehicle angular rate and specific force information and solve inertial navigation equations for obtaining the inertial navigation solution, such as position, velocity, and attitude, which is output to the integrated positioning/ground proximity warning processor.

3. Measure air pressure and compute barometric measurements which is output to the integrated positioning/ground proximity warning processor.

4. Measure the time delay between transmission and reception the radio signal from the terrain surface and compute radio altitude measurement which is output to the integrated positioning/ground proximity warning processor.

5. Access an onboard terrain database or access a ground-based terrain database by a data link for obtaining the current vehicle position and surrounding terrain height data which is output to the integrated positioning/ground proximity warning processor.

6. Receive position, velocity and time information or pseudorange and delta range measurements of the global positioning system, the inertial navigation solution, radio altitude measurement, radio altitude measurement, and the current vehicle position and surrounding terrain height data, and compute optimal positioning solution and optimal ground proximity warning solution.

Referring to FIG. 8, in step 1, the optimal vehicle position, velocity, acceleration, and attitude solution data received from step 6 is used to aid the signal tracking, acquisition, and reacquisition processing in the signal processor 16 of the global positioning system receiver 10 to obtain improved performance.

Referring to FIG. 9, in step 2, error feedback calibration methods in the error compensation 23, the transformation matrix computation 24, and the attitude position velocity computation 27 of the inertial navigation system 20 are performed using the optimal estimates of position errors, velocity errors and attitude errors of the inertial navigation solution and inertial sensor measurement errors from the 6 to obtain improved performance.

Referring to FIG. 2 and FIG. 7, a synthetic vision processing can be added to the step 6, in which the ground proximity warning solution is further processed to obtain an enhanced vision display for the flight crew.

Referring to FIG. 2 and FIG. 7, a voice processing can be added to the step 6, in which the ground proximity warning solution is further processed to obtain audible ground proximity warning messages for the flight crew.

The step 1~5 may be performed in parallel and in serial way.

Referring to FIG. 1 and FIG. 8, the step 1 further comprises the steps of:

1-1) receiving a radio frequency (RF) signal of the global positioning system by the global positioning system antenna 11, wherein the radio frequency (RF) signal is sent to a preamplifier circuit 12.

1-2) amplifying the input radio frequency (RF) signal of the global positioning system by preamplifier circuit 12 to improve its signal-noise ratio, and is output to the down converter 13.

1-3) converting the amplified radio frequency (RF) signal of the global positioning system by the down converter 13 by mixing with the local referencing signal from the oscillator 17 to the intermediate frequency (IF) signals, which is analog in-phase (I) and quadraphase (Q), wherein the IF signal is output to the band pass filter 14.

1-4) filtering the input IF signals by the band pass filter 14 to filter out and filtering out the noise of the input IF signals to improve their signal-noise ratio, wherein the filtered IF signals are sent to the IF sampling and A/D convert 15.

1-5) sampling the input IF signals in the IF sampling and A/D converter 15 to form the digital in-phase (I) and quadraphase (Q) signals which are output to the signal processor 16.

1-6) performing the signal acquisition, tracking, and reacquisition processing of the global positioning system in the signal processor 16 by using the input digital in-phase (I) and quadraphase (Q) signals, which are aided by the optimal vehicle position, velocity, acceleration, and attitude solution data provided the integrated positioning/ground proximity warning system processor 60, and for computing the pseudorange, delta range, and satellite ephemeris of the global positioning system, which is output to the navigation processor 18.

1-7) obtaining vehicle position, velocity, and time information by using the input pseudorange, delta range, and satellite ephemeris of the global positioning system to perform navigation computation in the navigation processor 18, wherein the Vehicle position, velocity, and time information, or input pseudorange, delta range, and satellite ephemeris are sent to the integrated positioning/ground proximity warning system processor 60.

Referring to FIG. 1 and FIG. 9, the step 2 further comprises the following steps:

2-1) Measure a vehicle body angular rates and specific force information by the inertial measurement unit 21, which are output to the error compensation 23.

2-2) Compensate the body angular rates and specific forces in the error compensation 23 with optimal estimates of inertial sensor errors from the integrated positioning/ground proximity warning system processor 60.

2-3) Update a transformation matrix from the body frame (b frame) to the n frame by using the compensated body angular rates and the rotation rate vector of the local navigation frame (n frame) with respect to the inertial frame (i frame) from an earth and vehicle rate computation 26, wherein the updated transformation matrix is compensated with the optimal estimates of attitude errors from the integrated positioning/ground proximity warning system processor 60 to remove attitude errors.

The way to update the transformation matrix is by the Euler method, or the direction cosine method, or the quaternion method.

The compensated transformation matrix is sent to the coordinate transformation computation 25 and the attitude position velocity computation 27.

2-4) Transform the compensated specific force input from the step 2-2, which is expressed in the body frame, in the coordinate transformation computation 25 to the specific force expressed in the navigation frame. The specific force expressed in the navigation frame is output to the attitude position velocity computation 27.

2-5) Compute the position and velocity by using the input specific force expressed in the navigation frame, which are further compensated with the optimal estimates of position errors and velocity errors from the integrated positioning/ground proximity warning system processor 60. The compensated transformation matrix from the step 2-3 is used to compute vehicle attitude. The compensated the position, velocity, and computed attitude are output to the Earth and vehicle rate computation 26 and the integrated positioning/ground proximity warning system processor 60.

2-6) The compensated the position, velocity, and computed attitude are used to compute a rotation rate vector of the local navigation frame (n frame) relative to the inertial frame (i frame) in the Earth and vehicle rate computation 26, which is output to the step 2-3.

In the step 3, an air pressure is measured by the baro altimeter 30 and transformed to the baro altitude measurements, which is sent to the integrated positioning/ground proximity warning system processor 60.

In the step 4, a radio signal is sent by the radio altimeter 40; the echoes of the radio from the terrain surface is received by the radio altimeter 40; the time delay between transmission and reception of the radio signal is measured and transformed to the radio altitude measurement by the radio altimeter 40, which are output to the integrated positioning/ground proximity warning system processor 60.

Referring to FIG. 2, the step 6 further comprises the following steps:

6-1. Accept position, velocity and time information or pseudorange and delta range measurements of the global positioning system receiver, the inertial navigation solution, radio altitude measurement, radio altitude measurement, and the current vehicle position and surrounding terrain height data from the step 1~step 5 through an input/output module 61.

6-2. The accepted position, velocity and time information or pseudorange and delta range measurements of the global positioning system, the inertial navigation solution, radio altitude measurement, radio altitude measurement, and the current vehicle position and surrounding terrain height data are used to compute optimal position, velocity, and attitude in a navigation solution module 62, by the following variable ways to obtain different degrees of performance of the system of the present invention:

6-2(a). Referring to FIG. 3, individual radio altimeter measurements from the radio altimeter 40, barometric altimeter measurements from the baro altimeter 30, and terrain data from the terrain database 50 are input to a correlation/matching 6201 through the input/output module 61. The individual radio altimeter measurements and barometric altimeter measurements are collected to construct a measured profile of terrain in an assigned time window. The terrain data is collected to construct a set of prestored reference terrain profiles which correspond to the area over which the vehicle is flying during the assigned window time. The measured terrain profile is then compared with the set of prestored reference terrain profiles in the correlation/matching 6201. Once a match is found, the geographic coordinates of the best matching reference profile is passed to a filter/estimator 6202.

In addition, the result of adding radio altimeter measurements with terrain height of the current vehicle position is different with the inertial altitude solution (or hybrid baro/inertial altitude measurement) in the correlation/matching 6201 to form altitude measurement residues, which is passed to the filter/estimator 6202.

The measurements from the global positioning system receiver 10, the inertial navigation solution from the inertial navigation system 20, and the geographic coordinates of the best matching reference profile and altitude measurement residues from the correlation/matching 6201 are filtered by the filter/estimator 6202 processes to obtain optimal estimates of the inertial navigation solution errors, errors of the global position system receiver, and errors of inertial sensors in a centralized filtering fashion, which is used to obtain the optimal positioning solution using the following two steps:

6-2(a)-1. Compensate the inertial navigation solution from the inertial navigation system 20 with the optimal estimates of the navigation solution errors in the filter/estimator 6202

6-2(a)-2. Feed back the optimal estimates of the inertial navigation solution errors and the inertial sensor errors to the inertial navigation system 20 to calibrate the errors.

6-2(b). Referring to FIG. 4, individual radio altimeter measurements from the radio altimeter 40, barometric altimeter measurements from the baro altimeter 30, and terrain data from the terrain database 50 are input to the correlation/matching 6211 through the input/output module 61. The individual radio altimeter measurements and barometric altimeter measurements are collected to construct a measured profile of terrain in an assigned time window. The terrain data is collected to construct a set of prestored reference terrain profiles which correspond to the area over which the vehicle is flying during the assigned window time. The measured terrain profile is then compared with the set of prestored reference terrain profiles in the correlation/matching 6211. Once a match is found, the geographic coordinates of the best matching reference profile is passed to a TAINS local filter 6212.

In addition, the result of adding radio altimeter measurements with terrain height of the current vehicle position is different with the inertial altitude solution (or hybrid baro/inertial altitude measurement) in the correlation/matching 6211 to form altitude measurement residues to the TAINS local filter 6212.

The inertial navigation solution errors and inertial sensor errors are modeled by the TAINS local filter 6212, and the obtained geographic coordinates of the best matching reference profile and altitude measurement residues are filtered by the TAINS local filter 6212 to obtain the local optimal estimates of inertial navigation solution errors and inertial sensor errors.

The measurements from the global positioning system receiver 10 and the inertial navigation solution from the inertial navigation system 20 are accepted and filtered by a INSGPS local filter 6213 to obtain the local optimal estimates of inertial navigation solution errors, global position system receiver errors, and inertial sensor errors.

The local optimal estimates and covariance matrix of inertial navigation solution errors, errors of the global position system receiver, and errors of the inertial sensor from the INSGPS local filter 6213 and the local optimal estimates and covariance matrix of the inertial navigation solution errors and errors of the inertial sensor from the TAINS local filter 6212 are accepted by a master filter 6214 and are filtered to provide the global optimal estimates of inertial navigation solution errors, the global position system receiver errors, and the inertial sensor errors.

The global optimal estimates of inertial navigation solution errors, the global position system receiver errors, and the inertial sensor errors and the covariance matrix obtained by the master filter 6214 are fed back to the INSGPS local filter 6213 and the TAINS local filter 6212 to reset the INSGPS local filter 6213 and the TAINS local filter 6212 and perform information-sharing among the master filter 6214, the INSGPS local filter 6213, and the TAINS local filter 6212.

The communication and estimation between the master filter 6214, the INSGPS local filter 6213, and the TAINS local filter 6212 may have different approaches to obtain different system performances.

The consistency test among the state estimates of the master filter 6214, the INSGPS local filter 6213, and the TAINS local filter 6212 can be performed by the master filter 6214 to detect and isolate the malfunction of a satellite of the global positioning system and to reconfigure the structure and process of the navigation solution module 62.

The optimal positioning solution can be obtained by the following two methods:

6-2(b).1. Compensate the inertial navigation solution from the inertial navigation system 20 with the optimal estimates of the navigation solution errors in the master filter 6214.

6-2(b).2. Feed back the optimal estimates of the inertial navigation solution errors and inertial sensor errors to the inertial navigation system 20 to calibrate the errors.

6-2(c). Referring to FIG. 5, the inertial navigation solution from the inertial navigation system 20, the baro altitude measurement from the baro altimeter 30, the radio altitude measurement from the radio altimeter 40, and terrain data from the terrain database 50 are inputs to an individual terrain clearance computation 6221.

The individual baro altitude measurements (or hybrid baro/inertial altitude measurement) is subtracted by the height of terrain at the current position to form the referenced individual terrain-clearance measurement. The radio altitude measurement is the individual measured terrain-clearance measurement. The deference between the measured terrain-clearance measurement and a referenced terrain-clearance measurement is output by the individual terrain clearance computation 6221 to a filter/estimator 6222.

Due to the undulating nature of terrain, the terrain-clearance measurement is a nonlinear function of vehicle position. Furthermore, the difference between the measured terrain-clearance measurement and the referenced terrain-clearance measurement is a function of the inertial navigation solution errors.

The terrain clearance measurement equation is theoretically a nonlinear function of the antenna pattern of the radio altimeter 40, the cross-range/downrange position, altitude, and attitude of the vehicle. Generally, a reasonable approximation to the k th referenced terrain clearance measurement is $$TC_k = h_{INS} - h(X_k, Y_k) + v_k \quad (1)$$

where, $TC_k$ is the k th referenced terrain clearance measurement; $h_{INS}$ is the height of the vehicle indicated by the inertial navigation system 20 or hybrid baro/inertail altitude measurement; $h(X_k, Y_k)$ is the height of the terrain at the position (X,Y) indicated by the inertial navigation system 20; $v_k$ is the error of the terrain database 50.

The measurements from the global positioning system receiver 10, inertial navigation solution from the inertial navigation system 20, and the difference between the measured terrain-clearance measurement and referenced terrain-clearance measurement from the individual terrain clearance computation 6221 are filtered by the filter/estimator 6222 processes in a centralized filtering fashion to obtain optimal estimates of the inertial navigation solution errors, the global position system receiver errors, and the inertial sensor errors.

Because the $h(X_k, Y_k)$ is a nonlinear function of the position (X,Y), the filter/estimator 6222 is a nonlinear filter/estimator.

The optimal positioning solution can be obtained by using the following two methods:

6-2(c)-1. Compensate the inertial navigation solution from the inertial navigation system 20 with the optimal estimates of the navigation solution errors in the filter/estimator 6222.

6-2(c)-2. Feed back the optimal estimates of the inertial navigation solution errors and the inertial sensor errors to the inertial navigation system 20 to calibrate the errors.

6-2(d). Referring to FIG. 6, the inertial navigation solution from the inertial navigation system 20, the baro altitude measurement from the baro altimeter 30, the radio altitude measurement from the radio altimeter 40, and terrain data from the terrain database 50 are inputs to an individual terrain clearance computation 6231. The individual baro altitude measurements (or hybrid baro/inertail altitude measurement) is subtracted by the height of terrain at the current position to form the referenced individual terrain-clearance measurement. The radio altitude measurement is the individual measured terrain-clearance measurement. The individual terrain clearance computation 6231 outputs the difference between the measured terrain-clearance measurement and the referenced terrain-clearance measurement to a TAINS local filter 6232.

The inertial navigation solution errors and inertial sensor errors are modeled the TAINS local filter 6232, and the difference between the measured terrain-clearance measurement and the referenced terrain-clearance measurement is filtered by the TAINS local filter 6232 to obtain the local optimal estimates of inertial navigation solution errors and inertial sensor errors.

Because the $h(X_k, Y_k)$ is a nonlinear function of the position (X,Y), the TAINS local filter 6232 is a nonlinear filter/estimator or extended Kalman filter.

The measurements of GPS from the global positioning system receiver 10 and the inertial navigation solution from the inertial navigation system 20 are accepted and processed by an INSGPS local filter 6233 to obtain the local optimal estimates of inertial navigation solution errors, the global position system receiver errors, and the inertial sensor errors.

The local optimal estimates and covariance matrix of the inertial navigation solution errors, the global position system receiver errors, and the inertial sensor errors from the INSGPS local filter 6233 and the local optimal estimates and covariance matrix of the inertial navigation solution errors and the inertial sensor errors from the TAINS local filter 6232 are filtered by the master filter 6234 and provides the global optimal estimates of inertial navigation solution errors, errors of global position system receiver, and errors of inertial sensor.

The global optimal estimates of inertial navigation solution errors, the global position system receiver errors, and the inertial sensor errors and the covariance matrix obtained by the master filter 6234 are fed back to the INSGPS local filter 6233 and the TAINS local filter 6232 to reset the INSGPS local filter 6233 and the TAINS local filter 6232 and perform information-sharing among the master filter 6234, the INSGPS local filter 6233, and the TAINS local filter 6232.

The communication and estimation among the master filter 6234, the INSGPS local filter 6233, and the TAINS local filter 6232 may have different approaches to obtain different system performance.

The consistency test among the state estimates of the master filter 6234, the INSGPS local filter 6233, and the TAINS local filter 6232 can also be performed by the master filter 6234 to detect and isolate the malfunction of the satellite of the global positioning system and to reconfigure the structure and process of the navigation solution module.

The optimal positioning solution can be obtained using the following two methods:

6-2(d)-1. Compensate the inertial navigation solution from the inertial navigation system 20 with the optimal estimates of the navigation solution errors in the master filter 6234.

6-2(d)-2. Feed back the optimal estimates of the inertial navigation solution errors and the inertial sensor errors to the inertial navigation system 20 to calibrate the errors.

6-3) Referring to FIG. 2, input the optimal navigation solution from the navigation solution module 62, the surrounding terrain data from the terrain database 50, and the vehicle performance and configuration data from the onboard flight control and management system 90, and compute the ground proximity warning solution. Referring to FIG. 7, the step 6-3 comprises the following steps:

6-3(a) Compute the query parameters using the optimal navigation solution from the navigation solution module 62 in the query parameter computation 631, which is sent to the terrain database 50 to access the terrain data of the current vehicle position and surrounding terrain.

6-3(b) Predict the projected flight path to the warning decision 633, using the accepted optimal navigation solution from the navigation solution module 62 received and collected by the flight path prediction 632, and the vehicle performance and configuration data from the onboard flight control and management system 90 received by the flight path prediction 632.

6-3(c) Compute and compare, using the accepted projected flight path from the flight path prediction 632, the vehicle performance and configuration data from the onboard flight control and management system 90, such as glide slope, landing gear, etc., and the surrounding terrain data from the terrain database 50 in the warning decision 634 receives. If the projected flight path is too close to the terrain, a warning decision message are made by the warning decision 633 which are sent to the flight path planning aiding 634, the synthetic vision processing 635 and the voice processing 636.

6-3(d) Receive the warning decision message and the current vehicle position, velocity, and attitude information from the warning decision 633 and the surrounding terrain data from the terrain database 50, and the vehicle performance and configuration data from the onboard flight control and management system 90, and compute an optimal evasion flight path to aid the flight crew in the flight path plan aiding 634.

6-4(e) Rreceive the projected flight path and warning decision message from the warning decision 633, the surrounding terrain data from the terrain database 50, and the suggested optimal evasion flight path from the flight path plan aiding 634, and compute the driving data in the synthetic vision processing 635 for the synthetic vision system 70.

6-2(f) Receive the projected flight path and warning decision message from the warning decision 633, the surrounding terrain data from the terrain database 50, and the suggested optimal evasion flight path from the flight path plan aiding 634, and compute the driving data in the voice processing 636 for the voice device 80.

In order to obtain collision avoidance with ground and water, as well as other near objects, the second embodiment of the present invention is disclosed as follows.

Figure 10:
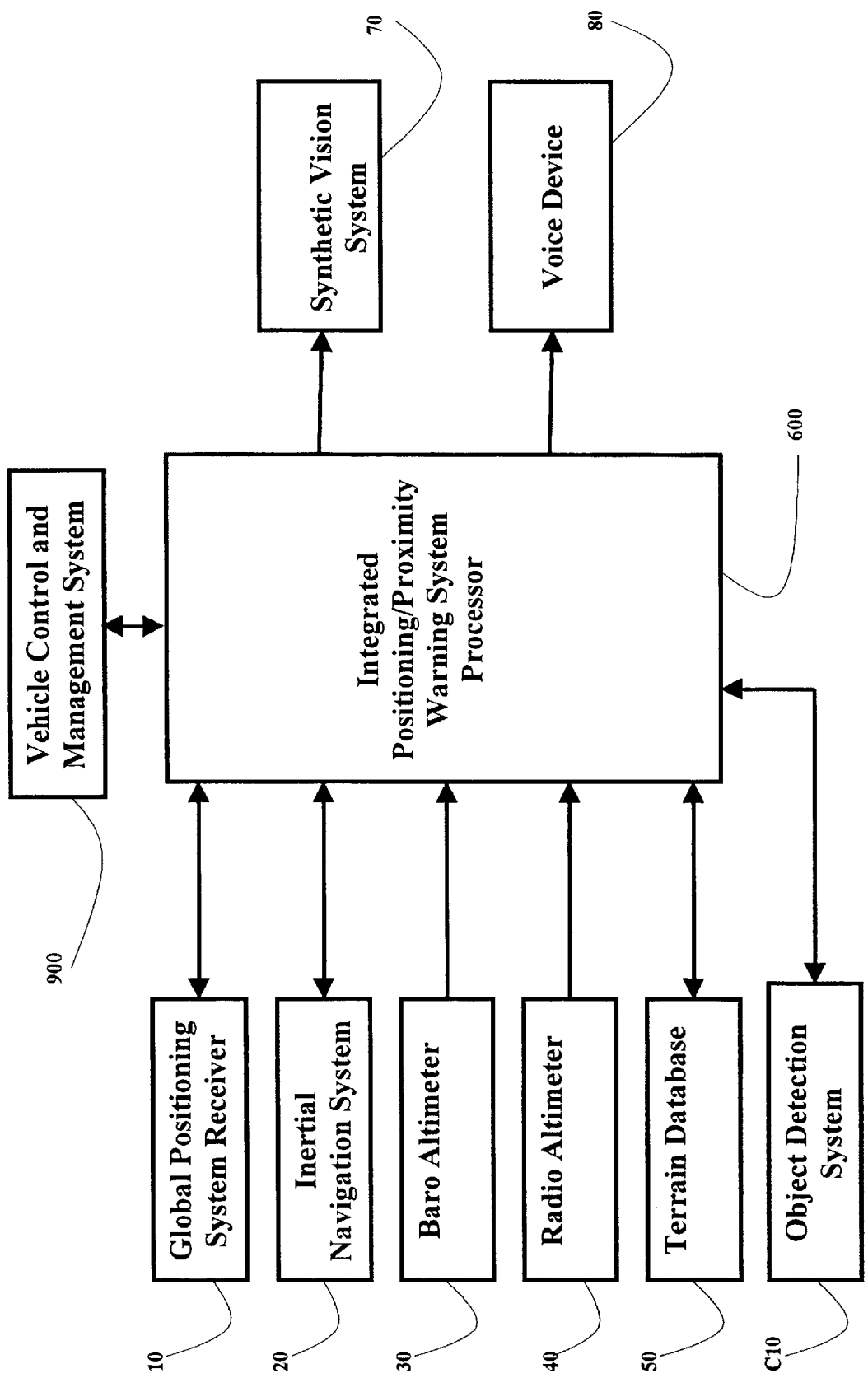
FIG. 10 is a block diagram illustrating an integrated positioning and proximity warning method and system according to the second embodiment of the system of the present invention.

Referring to FIG. 10, the integrated positioning and proximity warning system comprises a global positioning system receiver 10, an inertial navigation system 20, a baro altimeter 30, a radio altimeter 40, a terrain database 50, an object detection system C10, and a positioning/proximity warning system processor 600.

The global positioning system receiver 10 receives global positioning system signals and derives position, velocity and time information or pseudorange and delta range measurements of the global positioning system.

The inertial navigation system 20 solves navigation equations with angular rate and specific force information from an inertial measurement unit and obtains an inertial navigation solution.

The baro altimeter 30 provides baro altitude measurements. The radio altimeter 40 provides radio altitude measurements from the terrain surface. The terrain database 50 provides global terrain data and obtains the terrain height of the current vehicle position and surrounding terrain height data.

The object detection system C10 provides position and dynamic data of near objects. Position data includes three dimensional coordinates in a global coordinate system, such as WGS-84 (World Geodetic System-1984). Those coordinates are called absolute position of near objects. For example, another ground or air vehicle equipped with a GPS receiver or other navigation system can determine its own location in a global coordinate system. These data is sent to other vehicles through a wireless network, thus received by the object detection system C10. Based on the absolute position data of near objects and the host vehicle's position, the relative position is derived and potential collision can be detected.

The object detection system C10 provides position data relative to the host vehicle, which is called relative position. The relative position is obtained from either passive sensors or active sensors. Passive sensors include passive imager, passive infrared sensors, and stereo cameras. Passive sensors usually obtain passive image sequences of near objects. Stereo cameras comprises of more than one camera to obtain stereo images. The relative position and dynamic data of near objects are derived from either image sequence or stereo images. Thus the potential collision can be detected. Active sensors include forward looking radar and active imager (such as Laser Dynamic Range Imager-LDRI).

Those active sensors can easily detect the relative range and velocity between the object and host vehicle. The orientation of the sensor is also known, thus the relative position and dynamic information is derived to provide input for collision detection and collision avoidance processing.

The essential requirements for the Object Detection System C10 for an aircraft includes the following:

(a) Must operate continuously in real-time (b) Needs 360-degree visualization about its own aircraft.

(c) Requires range, azimuth, and velocity between the vehicle and the near object.

The positioning/proximity warning system processor 600 receives data from the global positioning system receiver 10, the inertial navigation system 20, the baro altimeter 30, the radio altimeter 40, the terrain database 50, and object detection system C10. The positioning/proximity warning system processor 600 also receives vehicle performance and configuration data from an onboard vehicle control and management system 900 and provides optimal position, velocity, attitude navigation information, and an optimal proximity warning information.

Figure 11:
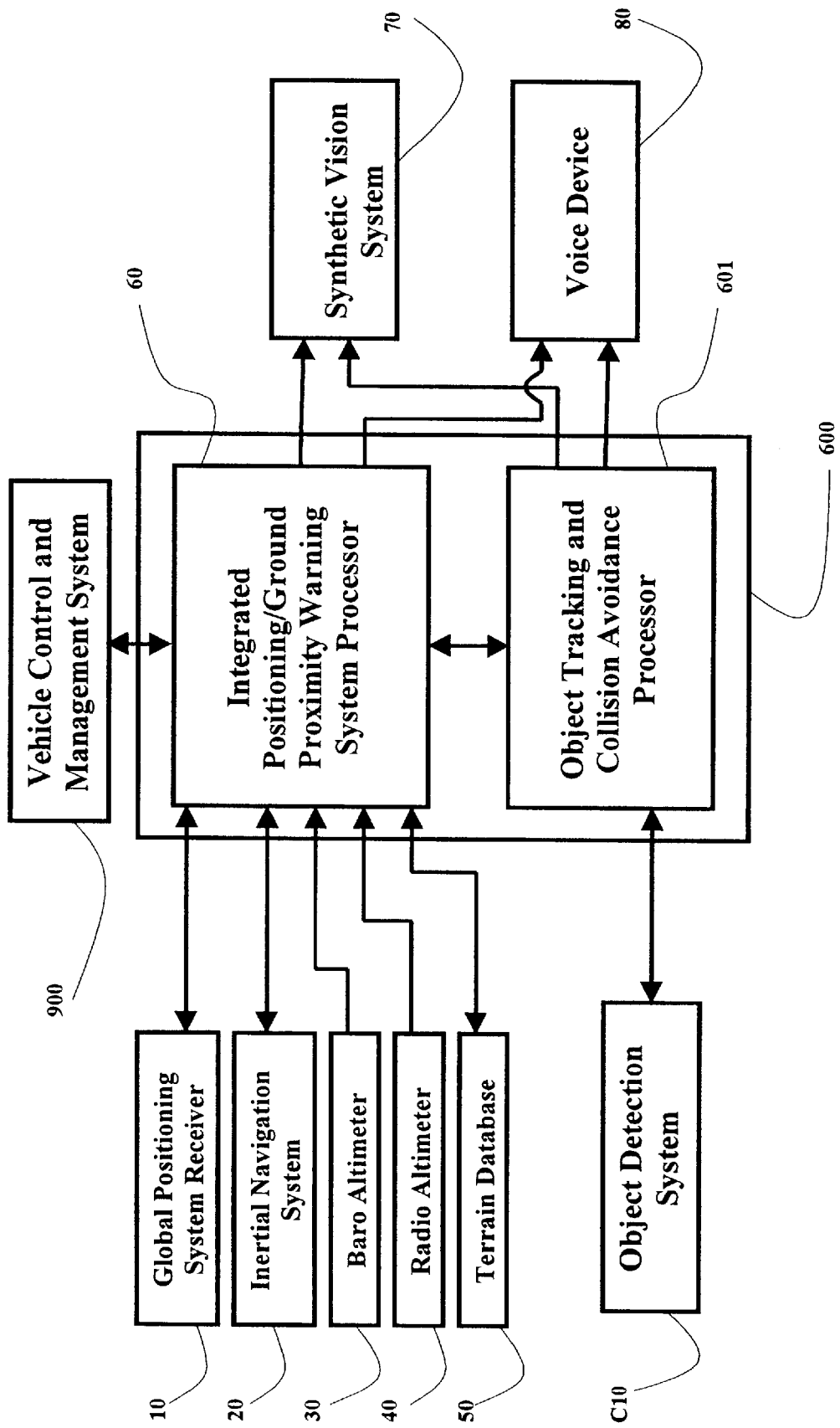
FIG. 11 is a block diagram illustrating the integrated positioning and proximity warning processor according to the second embodiment of the system of the present invention.
Figure 12:
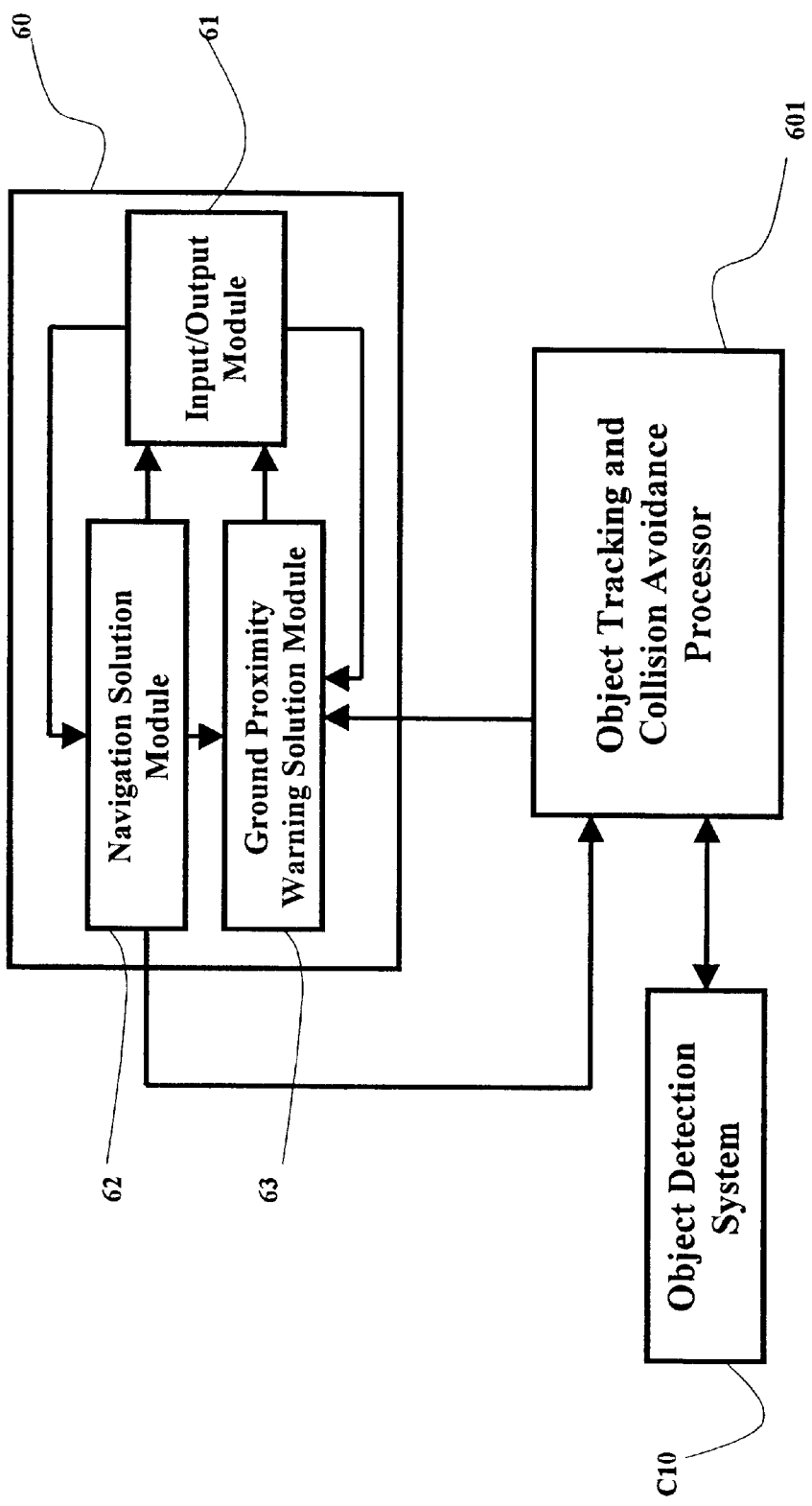
FIG. 12 is a block diagram illustrating the objective tracking and collision avoidance processor according to the second embodiment of the system of the present invention.

Referring to FIG. 11, the positioning/proximity warning system processor 600 further comprises the integrated positioning/ground proximity warning processor 60 and the object tracking and coollision avoidance processor 601. The integrated positioning/ground proximity warning processor 60 provides not only precision position and dynamic data of the host vehicle, but also ground warning message to the object tracking and coollision avoidance processor 601. The position and dynamic data of the host vehicle and the absolute position or relative position of near objects obtained from the object detection system C10 are used to detect potential collisions between the host vehicle and near objects. The ground proximity warning message is incorporated in the collision avoidance processing. For example, when a ground proximity warning is detected and the host vehicle can not avoid a collision with the other vehicle by performing a dive because it is too close to the ground.

The object tracking and coollision avoidance processor 601 has multiple operation modes. The first operation mode is to provide indication for potential collisions. Under this operation mode, a voice alert of potential collision is triggered to warn the pilot, driver or operator, driver or operator of the vehicle. "One o'clock, 2 miles" means that there exists an object at a distance of 2 miles and 30 degreees left. "Ten o'clock, 3 miles" means that there exists an object at a distance of 3 miles and 60 degreees right. Another indication of potential collision is a flashing object on a display where the flashing object represents the near object with which a collision will happen if emergency operation is not performed.

The degree to which the other objects must be evaded by the host vehicle, and the severity of a precarious near proximity situation, are defined by dynamic relative spaces about the host vehicle and other near objects. These spaces represent the time varying temporal and spatial spaces about a vehicle, which is required for the host vehicle to perform an evasive maneuver to avoid a collision with other objects.

Many different types of evasive maneuvers are available to the host vehicle to evade near objects including other aircraft. Horizontal maneuvers are performed by changing the heading of the host vehicle by banking or horizontal speed maneuvers or a combination of banking left and right, by increasing or decreasing its speed, or vertical maneuvers by climbing or descending. Horizontal maneuvers are the most effective in providing long term separation between two aircraft. Vertical maneuvers provide the greatest immediate separation between two aircraft. Speed maneuvers are the least effective in separating the two aircraft. Any combination of the aforementioned maneuvers is possible, but generally speaking, a horizontal banking maneuver on the part of the host vehicle is the most desirable in the event of a slight or medium range evasive maneuver. A vertical maneuver is the most advantageous in the event of a violation of the collision space of either vehicle. When a ground proximity warning is detected, a vertical maneuver of diving is prohibited.

The host vehicle is located at the center of the display. Other information delivered on the display includes the relative location, range, azimuth and heading. Three surrounding air space levels are identified as green for safe, yellow for unsafe, and red for emergency. For convenience, the scale of the display is dynamically changeable. The scale information for the current display is shown on the screen. Other text information about the absolute location of aircraft is also provided.

The second operation mode of the object tracking and collision avoidance processor 601 is to provide an evasion path for the pilot, driver or operator, driver or operator. The evasion path is shown on the display or is presented in a fashion of voice. "Left banking 5 degree" is an example of such voice instruction generated by the object tracking and collision avoidance processor 601.

The third operation mode of the object tracking and collision avoidance processor 601 is to generate evasion commands and send those commands to the vehicle control system. The vehicle control system automatically controls the actuators of the vehicle and avoid potential collisions.

The object tracking and collision avoidance processor 601 further comprises an object trajectory predictor, threat level computation module, and a collision avoidance aiding provider.

The object trajectory predictor receives the current position data of the object from the object detection system C10 to predict the future trajectory of the object in a predetermined interval, by using a dynamic model of the object.

The threat level computation module receives the current and future position data of the object and the current and future position data of the vehicle to determine the threat level of the collision, for example, the geometry of vehicle and object is in safe space, or unsafe space, or collision space. If the geometry of vehicle and object is in unsafe space, or collision space, warning voice and action must be created.

The collision avoidance aiding provider creates warning voice and action if the geometry of vehicle and object is in unsafe space, or collision space, including creating a safe path to the pilot, driver or operator of the vehicle and command the vehicle maneuver if the pilot, driver or operator does not reaction for the warning in pre-determined time.

The global positioning system receiver 10 is connected with the integrated positioning/ground proximity warning processor 60. The inertial navigation system 20 is connected with the integrated positioning/ground proximity warning processor 60. The baro altimeter 30 is connected with the integrated positioning/ground proximity warning processor 60. The radio altimeter 40 is connected with the integrated positioning/ground proximity warning processor 60. The terrain database 50 is connected with the integrated positioning/ground proximity warning processor 60.

A synthetic vision system 70 can be connected with the positioning/ground proximity warning system processor 60 to provide the flight crew with an enhanced vision field display for the ground proximity warning.

A voice device 80 can be connected with the positioning/ ground proximity warning system processor 60 to provide the flight crew with audible ground proximity warning messages.

The object detection system C10 provides notice that an object has been found in the neighborhood. The object detection system C10 does not necessarily identify the detailed character of the object although it could do so on occasion. It simply alerts that there is an object in the neighborhood that merits further attention.

Object detection is effected by exploiting object features that are sufficient to discriminate it from its background or the surrounding environment it is embedded in. For example, the detection module can alert as to the presence of an airplane but possibly with no regard as to whether it is a Boeing 747 or an Airbus 320.

The The object tracking and collision avoidance processor 601 follows the motion of the object and its distance. With these two parameters known appropriate logic is then formulated to accommodate collision avoidance considerations.

Figure 13:
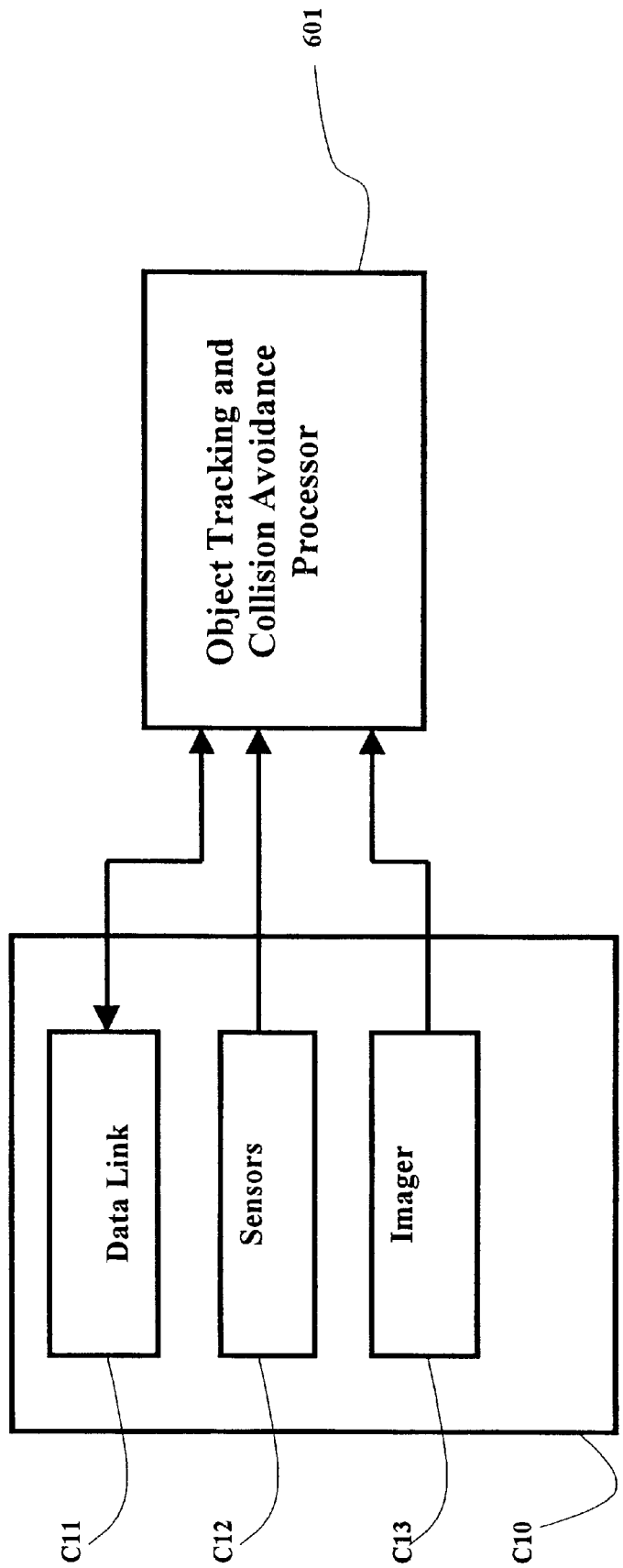
FIG. 13 is a block diagram illustrating the object detection system according to the second embodiment of the system of the present invention.
Figure 14:
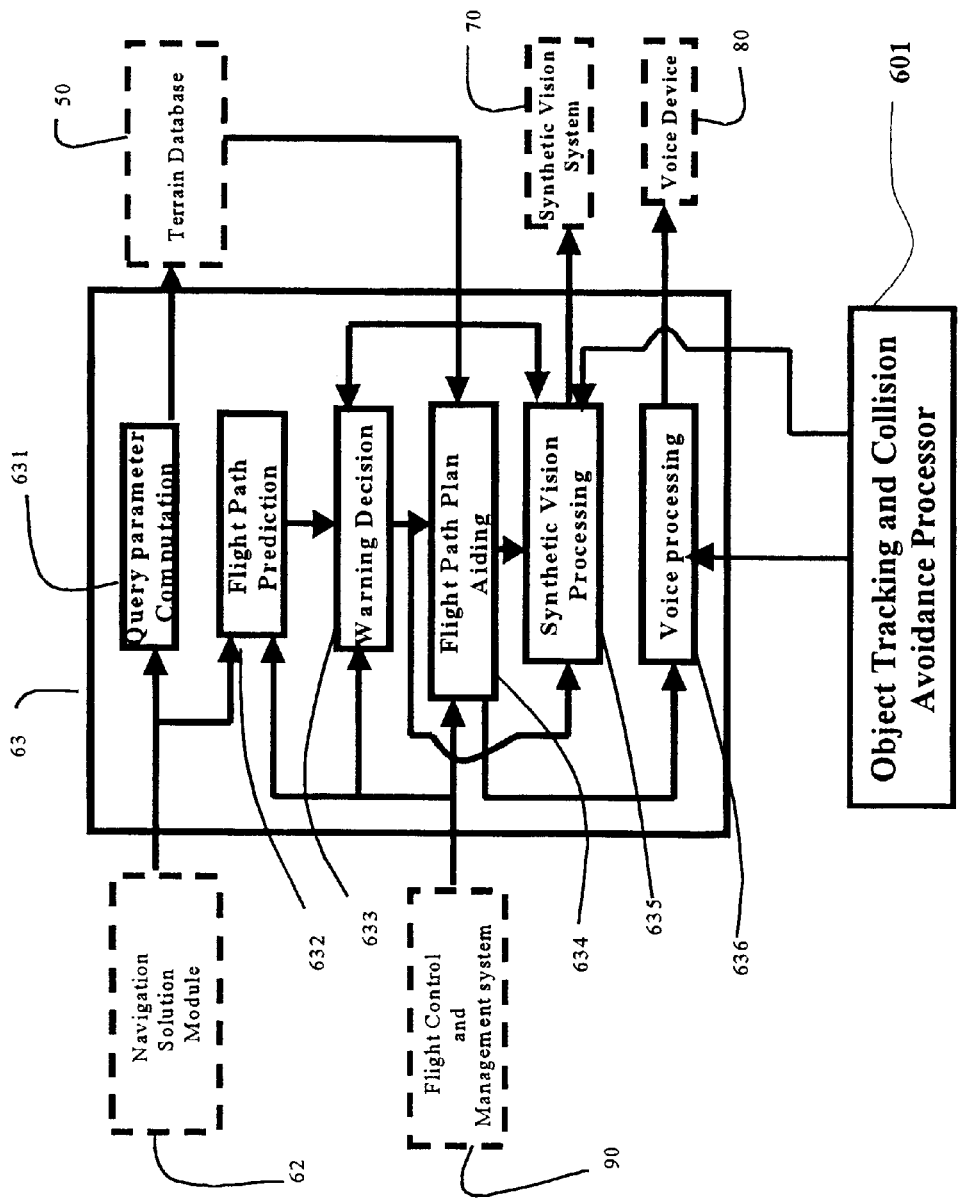
FIG. 14 is a block diagram illustrating the output of the objective tracking and collision avoidance processor according to the second embodiment of the system of the present invention.

Referring to FIG. 13, the object detection system C10 can be a data link C11, or sensors C12 or an imager C13. The sensors C12 include radar, laser, ladar, sonar, infrared and video, which can execute full/partial coverage of the surrounding views.

The imager C13 can be a passive and/or active imager, including a LDRI (laser dynamic range sensor) imager.

The object tracking and collision avoidance Processor 601 of the present invention substantially achieves the following features:

(1) The object tracking and collision avoidance processor 601 determines the collision avoidance status with the potential approaching aircraft in a certain time epoch.

(2) The object tracking and collision avoidance processor 601 receives approaching aircraft positioning information from the Object Detection system. The positioning information includes the current time epoch and the position, velocity vector at the epoch.

(3) The object Tracking and Collision Avoidance Processor 601 calculates and determines the Approaching Aircraft Zone (AAZ). The AAZ is defined as the reachable airspace of the approaching aircraft.

(4) The object tracking and collision avoidance processor 601 receives the host positioning information from Integrated Positioning/Ground Proximity Warning System Processor. The positioning information includes the epoch, and the position, velocity vector at the epoch.

(5) The object tracking and collision avoidance processor 601 calculates and determines the region that the host might reach at the next calculation epoch under the current positioning information.

Certain logic is applied to calculate the intersection of the two regions and a certain criteria is applied to determine the warning status of the host aircraft.

The warning status is output to the Synthetic Vision system 70 and Voice Device 80.

The data link C11 is designed based on the following basic requirements of the object tracking and collision avoidance processor 601:

Group Registration: Any aircraft approaching the airspace must register into the collision avoidance communication system to obtain communication resources.

Group Un-registration: Any aircraft leaving the airspace must be unregistered from the communication system in order to release the communication resources.

Routine Data Exchange: With this data exchange logic, each aircraft in the airspace equally shares the other aircraft's information. The information includes: vehicle's real-time dynamic state and its maneuver parameters.

According to the definition of the International Standard Organization (ISO), any communication network can be divided into 7 layers. The ISO developed Open System Interconnection (OSI) protocols for data networking that facilitates multi-vendor equipment interoperability.

The data link is designed as a three layer system. The lowest layer is the physical network structure. The middle layer offers the basic management facilities to access the resources in the lowest layer and the highest layer. The application logic is applied in the highest communication layer.

The lower two layers relate to the specific network system. The application layer design includes 5 sub-modules: Incoming Package Management, Outgoing Package Management, Package Process Logic, Package Assemble Logic, and Online Vehicle Register Table.

Incoming Package Management

This module is used to receive the data package from the lower layer. It buffers, analyzes and classifies the incoming data packages.

Package Process Logic

This module interprets the packaged data and makes it available for use in the upper layer of the application.

Online Vehicle Register Table

This module manages the register table for group members. Every vehicle in the communication community in the airspace keeps items in the register table. This table is used to keep track of the communication status of all the members in the group. This table is critical for the communication system management.

Outgoing Package Management

This module takes charge of the transmission buffering, priority management of the outgoing data package. Typically this module prepares the data package for the lower layer.

Package Assemble Logic

This module translates the instruction from the upper layer into a data package for broadcasting in the communication system. The Online Vehicle Register Table offers the addresses of group members. The Dynamic State Acquisition Module offers the dynamic states of the host vehicle.

Referring to FIG. 1, the integrated positioning and proximity warning method comprises the following steps:

1. Receive global positioning system signals for deriving position, velocity and time information or pseudorange and delta range measurements of the global positioning system, which are output to an integrated positioning/ground proximity warning system processor.

2. Receive vehicle angular rate and specific force information and solve inertial navigation equations for obtaining the inertial navigation solution, such as position, velocity, and attitude, which is output to the integrated positioning/ground proximity warning processor.

3. Measure air pressure and compute barometric measurements which are output to the integrated positioning/ground proximity warning processor.

4. Measure the time delay between transmission and reception of the radio signal from the terrain surface and compute radio altitude measurement which is output to the integrated positioning/ground proximity warning processor.

5. Access an onboard terrain database or access a ground-based terrain database by a data link for obtaining the current vehicle position and surrounding terrain height data which is output to the integrated positioning/ground proximity warning processor.

6. Receive position, velocity and time information or pseudorange and delta range measurements of the global positioning system, the inertial navigation solution, baro altitude measurement, radio altitude measurement, and the current vehicle position and surrounding terrain height data, and compute optimal positioning solution and optimal ground proximity warning solution.

7. Receive the optimal positioning solution and position data of near objects and determine the optimal proximity warning solution with the near object.

In some applications, it is only desired to obtain collision avoidance with near objects, for example, land and water vehicle. The third embodiment of the present invention comprises navigation provide, an object detection system C10, and The object tracking and collision avoidance processor 601.

The navigation provider may be a global positioning system receiver 10 or an inertial navigation system 20, with or without a baro altimeter 30, a radio altimeter 40, or a terrain database 50, to provide position data of the vehicle.

The object detection system C10 provides position and dynamic data of near objects. Position data includes three dimensional coordinates in a global coordinate system, such as WGS-84 (World Geodetic System-1984). Those coordinates are called absolute position of near objects. For example, another ground equipped with a GPS receiver or other navigation system can determine its own location in a global coordinate system. These data is sent to other vehicles through a wireless network, thus received by the object detection system C10. Based on the absolute position data of near objects and the host vehicle's position, the relative position is derived and potential collision can be detected.

The object tracking and collision avoidance processor 601 receives vehicle performance and configuration data from an onboard vehicle control and management system 900, position data of the vehicle, and position and dynamic data of near objects to provide an optimal proximity warning information.

What is claimed is:

1. A positioning and proximity warning method, comprising the steps of:
   (a) receiving global positioning system signals for deriving position, velocity and time information or pseudorange and delta range measurements of a global positioning system, and outputting said global positioning system signals to an integrated positioning/ground proximity warning system processor;
   (b) receiving vehicle angular rate and specific force information for computing an inertial navigation solution, including position, velocity, and attitude of said vehicle, by solving inertial navigation equations, and outputting said inertial navigation solution to said integrated positioning/ground proximity warning processor;
   (c) measuring air pressure, and computing barometric measurements which is output to said integrated positioning/ground proximity warning processor;
   (d) measuring time delay between transmission and reception a radio signal from a terrain surface, and computing radio altitude measurement which is output to said integrated positioning/ground proximity warning processor;
   (e) accessing a terrain database for obtaining current vehicle position and surrounding terrain height data which is output to said integrated positioning/ground proximity warning processor;
   (f) receiving said position, velocity and time information or said pseudorange and delta range measurements of said global positioning system, said inertial navigation solution, said radio altitude measurement, said radio altitude measurement, and said current vehicle position and surrounding terrain height data, and computing optimal positioning solution data and optimal ground proximity warning solution data; and
   (g) receiving optimal positioning solution and position data of near objects and determining a optimal proximity warning solution with said near objects.

2. The positioning and proximity warning method, as recited in claim 1, wherein said position data are the step (g) further comprising a step of:
   receiving said optimal positioning solution and absolute position data of near objects and determining an optimal proximity warning solution with said near objects.

3. The positioning and proximity warning method, as recited in claim 1, wherein the step (g) further comprising a step of:
   receiving said optimal positioning solution and relative position data of near objects and determining an optimal proximity warning solution with said near objects.

4. The positioning and proximity warning method, as recited in claim 1, after the step (g), further comprising a step of:
   (h) providing an indication for potential collisions.

5. The positioning and proximity warning method, as recited in claim 1, after the step (g), further comprising a step of:
   generating evasion commands and sending said evasion commands to a control system of said vehicle.

6. A positioning and proximity warning system, comprising:
   a global positioning system receiver for receiving global positioning system signals and deriving position, velocity and time information or pseudorange and delta range measurements of a global positioning system;
   an inertial navigation system for solving navigation equations with angular rate and specific force information from an inertial measurement unit and obtaining an inertial navigation solution;
   a baro altimeter for providing baro altitude measurements;
   a radio altimeter for providing a radio altitude measurement from a terrain surface;
   a terrain database for providing global terrain data and obtaining a terrain height of current vehicle position and surrounding terrain height data;
   an object detection system providing position and dynamic data of near objects; and
   a positioning/proximity warning system processor for receiving data from said global positioning system receiver, said inertial navigation system, said baro altimeter, said radio altimeter, said terrain database, and said object detection system, wherein said positioning/proximity warning system processor also receives vehicle performance and configuration data from an onboard vehicle control and management system and providing optimal position, velocity, attitude navigation information, and an optimal proximity warning information.

7. A positioning and proximity warning system, as recited in claim 6, wherein said object tracking and collision avoidance processor further comprises an object trajectory predictor, a threat level computation module, and a collision avoidance aiding provider, wherein said object trajectory predictor receives current position data of said objects from said object detection system to predict said future trajectory of said object in a pre-determined interval, by using a dynamic model of said objects, wherein said threat level computation module receives said current and future position data of said objects and said current and future position data of said vehicle to determine said threat level of said collision, wherein said collision avoidance aiding provider creates warning voice and action when said geometry of vehicle and objects is in an unsafe space or a collision space.

8. The positioning and proximity warning system, as recited in claim 6, wherein said positioning/proximity warning system processor further comprising an integrated positioning/ground proximity warning processor providing precision position and dynamic data of said vehicle and ground proximity warning message; and an object tracking and collision avoidance processor providing an object proximity warning message.

9. The positioning and proximity warning system, as recited in claim 8, wherein said object tracking and collision avoidance processor further comprises an object trajectory predictor, a threat level computation module, and a collision avoidance aiding provider, wherein said object trajectory predictor receives current position data of said objects from said object detection system to predict said future trajectory of said object in a pre-determined interval, by using a dynamic model of said objects, wherein said threat level computation module receives said current and future position data of said objects and said current and future position data of said vehicle to determine said threat level of said collision, wherein said collision avoidance aiding provider creates warning voice and action when said geometry of vehicle and objects is in an unsafe space or a collision space.

10. The positioning and proximity warning system, as recited in claim 8, wherein said object detection system provides an absolute position of said near objects.

11. The positioning and proximity warning system, as recited in claim 8, wherein said object detection system provides a relative position of said near objects.

12. The positioning and proximity warning system, as recited in claim 8, wherein said object detection system comprises passive sensors.

13. The positioning and proximity warning system, as recited in claim 8, wherein said object detection system comprises active sensors.

14. The positioning and proximity warning system, as recited in claim 8, wherein said object tracking and collision avoidance processor has multiple operation modes.

15. The positioning and proximity warning system, as recited in claim 14, wherein said object tracking and collision avoidance processor provides an indication for potential collisions, including a voice alert of potential collision triggered to warn a pilot, driver or operator, driver or operator of said vehicle through a voice device, and a flashing object on a display of a synthetic vision system where said flashing object represents said near object with which a collision will happen if emergency operation is not performed.

16. The positioning and proximity warning system, as recited in claim 14, wherein said object tracking and collision avoidance processor provides an evasion path for said pilot, driver or operator, driver or operator, using a voice device and synthetic vision system.

17. The positioning and proximity warning system, as recited in claim 14, wherein said object tracking and collision avoidance processor generates evasion commands and sends said evasion commands to a vehicle control system, and said vehicle control system automatically controls actuators of said vehicle and avoid potential collisions.

18. The positioning and proximity warning system, as recited in claim 8, wherein said object detection system is a data link with said near objects.

19. The positioning and proximity warning system, as recited in claim 18, wherein, in airspace, said data link further provides:

a group registration for an aircraft approaching said airspace to register to obtain communication resources;

a group un-registration for said aircraft leaving said airspace to be unregistered in order to release said communication resources; and a routine data exchange which provides a data exchange logic for said aircraft in said airspace equally shares other aircraft's information, wherein said information includes a real-time dynamic state and maneuver parameters thereof.

20. The positioning and proximity warning system, as recited in claim 18, wherein said data link is designed as a three layer system, including a highest layer and a lowest layer which are physical network structures and a middle layer which offers basic management facilities to access resources in said lowest layer and said highest layer, wherein said application logic is applied in said highest layer.

21. The positioning and proximity warning system, as recited in claim 20, wherein said application layer design includes five sub-modules, including;

an Incoming Package Management used to receive the data package from said lower layer so as to buffer, analyze and classify incoming data packages;

a Package Process Logic for interpreting said data packages and making available for use in said upper layer;

an Online Vehicle Register Table for managing a register table for group members, wherein said aircraft in a communication community in said airspace keeps items in a register table which is used to keep track of a communication status of each of said group members;

an Outgoing Package Management for taking charge of a transmission buffering, apriority management of an outgoing data package for said lower layer; and a Package Assemble Logic for translating an instruction from said upper layer into one of said data package for broadcasting in said communication community, said Online Vehicle Register Table offers addresses of said group members while said Dynamic State Acquisition Module offers dynamic states of said aircraft.

22. A positioning and proximity warning system for obtain collision avoidance with near objects, comprising a navigation provider providing position data of a vehicle;

an object detection system providing position and dynamic data of near objects; and an object tracking and collision avoidance processor receiving a vehicle performance and configuration data from an onboard vehicle control and management system, position data of said vehicle, and position and dynamic data of said near objects to provide an optimal proximity warning information.

23. The positioning and proximity warning system, as recited in claim 22, wherein said navigation provider further comprises a global positioning system receiver and a radio altimeter to provide said position data of said vehicle.

24. The positioning and proximity warning system, as recited in claim 22, wherein said navigation provider further comprises a global positioning system receiver with a baro altimeter and a radio altimeter to provide said position data of said vehicle.

25. The positioning and proximity warning system, as recited in claim 22, wherein said navigation provider further comprises a global positioning system receiver and a terrain database to provide said position data of said vehicle.

26. The positioning and proximity warning system, as recited in claim 22, wherein said navigation provider further comprises a global positioning system receiver with a baro altimeter and a terrain database to provide said position data of said vehicle.

* * * * *